(12) United States Patent
Yamada et al.

(10) Patent No.: US 10,926,734 B2
(45) Date of Patent: Feb. 23, 2021

(54) AIRBAG DEVICE FOR A PASSENGER SEAT

(71) Applicant: TOYODA GOSEI CO., LTD., Kiyosu (JP)

(72) Inventors: Ikuo Yamada, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 71 days.

(21) Appl. No.: 16/294,290

(22) Filed: Mar. 6, 2019

(65) Prior Publication Data

US 2019/0283702 A1 Sep. 19, 2019

(30) Foreign Application Priority Data

Mar. 16, 2018 (JP) .............................. JP2018-49715

(51) Int. Cl.
| | |
|---|---|
| *B60R 21/233* | (2006.01) |
| *B60R 21/2338* | (2011.01) |
| *B60R 21/00* | (2006.01) |
| *B60R 21/217* | (2011.01) |
| *B60R 21/239* | (2006.01) |

(Continued)

(52) U.S. Cl.
CPC ........ *B60R 21/233* (2013.01); *B60R 21/2338* (2013.01); *B60R 21/205* (2013.01); *B60R 21/2176* (2013.01); *B60R 21/239* (2013.01); *B60R 2021/0009* (2013.01); *B60R 2021/0048* (2013.01); *B60R 2021/23161* (2013.01); *B60R 2021/23382* (2013.01)

(58) Field of Classification Search
CPC .............. B60R 21/233; B60R 21/2338; B60R 2021/23161; B60R 2021/23382; B60R 2021/0009; B60R 2021/0048; B60R 21/2176; B60R 21/239; B60R 21/205
See application file for complete search history.

(56) References Cited

U.S. PATENT DOCUMENTS

| | | | |
|---|---|---|---|
| 9,187,055 B1* | 11/2015 | Genthikatti | ........... B60R 21/233 |
| 9,758,123 B2* | 9/2017 | Yamada | .............. B60R 21/2338 |
| 2017/0129439 A1 | 5/2017 | Taguchi et al. | |

(Continued)

FOREIGN PATENT DOCUMENTS

| | | |
|---|---|---|
| JP | 2017-114160 A | 6/2017 |
| WO | 2016/002384 A1 | 1/2016 |

*Primary Examiner* — Drew J Brown
(74) *Attorney, Agent, or Firm* — Posz Law Group, PLC

(57) ABSTRACT

An airbag body includes, in a protection region disposed in the rear portion, a front-collision arresting plane, an oblique-collision arresting plane, and an arresting recess that is recessed forward between the front-collision arresting plane and oblique-collision arresting plane. The airbag body further internally includes a tether that pulls a flat surfaced portion of the passenger protection region and forms the arresting recess out of the flat surfaced portion at airbag deployment. The tether includes a front-rear connecting region that connects a leading end of the arresting recess to the center of a front end portion of the airbag body, and a sideways connecting region that connects the leading end of the arresting recess to a side wall of the airbag body near the oblique-collision arresting plane. The joint of the sideways connecting region to the side wall is disposed farther forward than the leading end of the arresting recess.

8 Claims, 18 Drawing Sheets

(51) Int. Cl.
*B60R 21/205* (2011.01)
*B60R 21/231* (2011.01)

(56) References Cited

U.S. PATENT DOCUMENTS

| | | | |
|---|---|---|---|
| 2017/0166159 A1 | 6/2017 | Shin | |
| 2017/0355346 A1* | 12/2017 | Kobayashi | B60R 21/0136 |
| 2018/0022303 A1* | 1/2018 | Yamada | B60R 21/2338 |
| | | | 280/732 |
| 2018/0154856 A1* | 6/2018 | Yamada | B60R 21/26 |
| 2018/0154857 A1* | 6/2018 | Yamada | B60R 21/231 |
| 2018/0345901 A1* | 12/2018 | Yamada | B60R 21/2338 |
| 2018/0354450 A1* | 12/2018 | Yamada | B60R 21/23138 |
| 2019/0351862 A1* | 11/2019 | Aranzulla | B60R 21/231 |
| 2020/0010044 A1* | 1/2020 | Yamada | B60R 21/2338 |
| 2020/0122677 A1* | 4/2020 | Yamada | B60R 21/216 |

* cited by examiner

AIRBAG DEVICE FOR A PASSENGER SEAT

CROSS REFERENCE TO RELATED APPLICATIONS

The Present application claims priority from Japanese Patent Application No. 2018-049715 of Yamada et al., filed on Mar. 16, 2018, the entire disclosure of which is incorporated herein by reference.

BACKGROUND OF THE INVENTION

1. Field of the Invention

The present invention relates to an airbag device for a passenger seat adapted to be disposed in an instrument panel of a vehicle in front of the passenger seat. More particularly, the invention relates to an airbag device for a passenger seat including an airbag which is housed in a housing in a folded-up configuration and deployable rearward for protecting a passenger when fed with an inflation gas.

2. Description of the Related Art

JP 2016-020115 A discloses a known airbag device for a passenger seat whose airbag includes, in the rear portion as deployed, a front-collision arresting plane for protecting a head of a passenger in the event of a frontal collision of the vehicle, an oblique-collision arresting plane for protecting the head of the passenger in the event of an oblique collision or an offset collision of the vehicle, and an arresting recess which is recessed between the front-collision arresting plane and the oblique-collision arresting plane for receiving and arresting the head of the passenger. Additionally, the airbag internally includes a tether which is connected to a leading end of the arresting recess and keeps a recessed contour of the arresting recess.

However, the tether of the above airbag device is composed of only one tether which extends diagonally forward from the leading end of the arresting recess and is connected, by distal end, to a side wall of the airbag, which side wall extends generally in a front and rear direction at airbag deployment. This configuration is hardly able to form such an arresting recess that is narrow in width in a left and right direction. Even if such an arresting recess is formed, the arresting recess would not be steady in recessed contour because the arresting recess easily gapes open. This will not be sufficient for protecting the head of the passenger who moves diagonally forward.

SUMMARY OF THE INVENTION

An object of the present invention is to provide an airbag device for a passenger seat which is able to protect a head of a passenger adequately as he moves diagonally forward.

The object of the invention will be achieved by a following airbag device for a passenger seat:

The airbag device for a passenger seat of the invention is adapted to be mounted on an instrument panel in front of a passenger seat of a vehicle. The airbag device includes a housing that is adapted to be mounted on the instrument panel, and an inflatable airbag that is housed in the housing in a folded-up configuration. The airbag includes a bag body that is mounted on the housing by the front end portion so as to be deployed rearward, and a tether that is disposed inside the bag body for controlling a contour of the bag body as deployed. The bag body includes a first side wall and a second side wall that are opposed to each other in a left and right direction at airbag deployment.

A rear portion of the bag body as deployed serves as a passenger protection region that protects a passenger. The passenger protection region includes:

a front-collision arresting plane for protecting the head of the passenger as he moves forward in the event of a frontal collision of the vehicle;

an oblique-collision arresting plane that is disposed on a left side and/or a right side of the front-collision arresting plane for protecting the head of the passenger as he moves diagonally forward in the event of an oblique collision or an offset collision of the vehicle; and an arresting recess that is recessed forward between the front-collision arresting plane and the oblique-collision arresting plane for receiving and arresting the head of the passenger therein.

The arresting recess is formed of a flat surfaced portion of the passenger protection region by the tether. The tether pulls the flat surfaced portion and forms the arresting recess out of the flat surfaced portion at airbag deployment. The tether includes:

a front-rear connecting region that connects a leading end region of the arresting recess to a portion of the front end portion of the bag body in front of a center in a left and right direction of the front-collision arresting plane; and a sideways connecting region that connects the leading end region of the arresting recess to one of the side walls of the bag body which is disposed near the oblique-collision arresting plane.

A joint of the sideways connecting region to the side wall of the bag body is disposed farther forward than the leading end of the arresting recess.

In the airbag device for a passenger seat of the invention, the tether that forms the arresting recess at airbag deployment includes the front-rear connecting region and the sideways connecting region which extend from the leading end region of the arresting recess in a bifurcating fashion. Since an end of the front-rear connecting region and an end of the sideways connecting region are joined to positions in the bag body which are apart from each other in the left and right direction, the front-rear connecting region and the sideways connecting region are able to make the arresting recess recessed steadily such that the leading end is directed forward. More specifically, due to cooperation of the front-rear connecting region whose end is connected to the portion of the front end portion of the bag body in front of the center in the left and right direction of the front-collision arresting plane and the sideways connecting region whose joint to the side wall of the bag body is located farther forward than the leading end of the arresting recess, especially the sideways connecting region helps make a circumferential portion extending from the joint to the side wall to the leading end of the arresting recess inflated, which will act such that opposing walls of the arresting recess push each other and keep the arresting recess closed. Accordingly, the arresting recess will be deployed diagonally with respect to the front and rear direction while staying closed, generally along a travel direction of the head of the passenger which moves diagonally forward. An inclination angle of the arresting recess can be adequately changed by changing a length of the sideways connecting region and/or the position of the joint of the sideways connecting region to the side wall of the bag body. When the arresting recess configured as described above receives the diagonally-moving passenger's head, the head will go into the arresting recess in a squeezing fashion, thus the arresting recess will be able to arrest the head in a balanced fashion with the opposing walls. Accordingly, the airbag will be able to absorb a kinetic energy of the diagonally-moving head and arrest the head softly by receiving the head in the arresting recess.

Therefore, the airbag device for a passenger seat of the invention is able to protect the head of the passenger adequately as it moves diagonally forward.

In the airbag device of the invention, the arresting recess is formed out of a flat surfaced portion of the passenger protection region, by being pulled by the tether. With this configuration, the bag body does not have to be provided with an arresting recess in the production process, which will simplify the structure of the bag body and help reduce the workload and cost in production of the bag body.

In the airbag device for a passenger seat of the invention, the tether may be configured such that the front-rear connecting region and the sideways connecting region share a common region that extends from the leading end region of the arresting recess, and bifurcate from a front end of the common region. This configuration will further contribute to reduction of the workload and cost in the production process, and also reduce a volume of the airbag as folded up.

Nevertheless, the tether may also be configured such that the front-rear connecting region and the sideways connecting region separately extend from the leading end region of the arresting recess.

In the airbag device for a passenger seat of the invention, it is desired that:

the bag body includes a main inflatable section that includes a rear surface serving as the front-collision arresting plane, and a protruding inflatable section that protrudes rearward from the rear surface of the main inflatable section as deployed; and the oblique-collision arresting plane is composed of a side wall of the protruding inflatable section which extends generally along a front and rear direction and faces towards the front-collision arresting plane at airbag deployment.

With this configuration, when catching a head of a passenger who moves diagonally forward, the airbag is able to catch the head with the oblique-collision arresting plane first and guide it into the arresting recess. As a consequence, the airbag is able to arrest the head in the arresting recess further adequately in the event of an oblique collision or an offset collision of the vehicle.

If the oblique-collision arresting plane, the arresting recess and the tether are disposed both on the left side and right side of the front-collision arresting plane as deployed, the airbag will be able to protect a head of a passenger even if he moves forward towards an outboard direction or he moves forward towards an inboard direction.

In the event that the oblique-collision arresting plane, the arresting recess and the tether are disposed both on the left side and right side of the front-collision arresting plane as deployed, the tethers may be configured such that an outboard-side sideways connecting region of the tether which is deployed on an outboard side at airbag deployment has a smaller substantial length than an inboard-side sideways connecting region of the tether which is deployed on an inboard side. This configuration is able to make a width in the left and right direction of an outboard-side protruding inflatable region which is deployed on the outboard side smaller than that of an inboard-side protruding inflatable region, in other words, able to inflate the outboard-side protruding inflatable region thinner than the inboard-side protruding inflatable region at airbag deployment. The outboard-side protruding inflatable region as inflated thinly will be deployed smoothly even if a head-protecting airbag is deployed over the window at a side of the passenger seat, and will not interfere with the deployment of the head-protecting airbag. In the meantime, with no obstacles, the inboard-side protruding inflatable region as inflated thicker than the outboard-side protruding inflatable region will be able to catch adequately a head of a passenger which moves diagonally forward towards the driver's seat with its side wall, i.e. oblique-collision arresting plane.

The tethers may also be configured such that a protruding amount from the front-collision arresting plane of the outboard-side protruding inflatable section is smaller than that of the inboard-side protruding inflatable section. This configuration will also prevent the outboard-side protruding inflatable region from being engaged with the head-protecting airbag or the like at airbag deployment.

The airbag of the airbag device for a passenger seat of the invention may further include a transverse tether that is disposed generally along the left and right direction inside the bag body, and connects the first side wall of the bag body to the second side wall for limiting a width in the left and right direction of the bag body as inflated. By limiting a clearance between the opposed side walls of the bag body as inflated, the transverse tether will prevent the opposed side walls of the main inflatable section from being separated from each other too much during deployment, then, such a transverse tether will prevent the bag body from oscillating in the front and rear direction and in the left and right direction at airbag deployment, thus help inflate the bag body quickly.

The airbag of the airbag device for a passenger seat of the invention may internally include a first and a second oscillation-preventing tethers for preventing the bag body from oscillating during deployment. The first oscillation-preventing tether is disposed in front of the tether at airbag deployment and connects the portion of the front end portion of the bag body in front of the center in the left and right direction of the front-collision arresting plane and a side wall of the main inflatable section. The second oscillation-preventing tether is disposed in front of the tether at airbag deployment and connects the portion of the front end portion of the bag body in front of the center in the left and right direction of the front-collision arresting plane and the other side wall of the main inflatable section opposed to said side wall in the left and right direction. Each of the oscillation-preventing tethers is deployable diagonally with respect to a front and rear direction.

Such oscillation-preventing tethers will also prevent the opposed side walls of the main inflatable section from being separated from each other too much during deployment, thus prevent the bag body from oscillating in the front and rear direction and in the left and right direction. Therefore, the bag body will be able to be inflated quickly.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
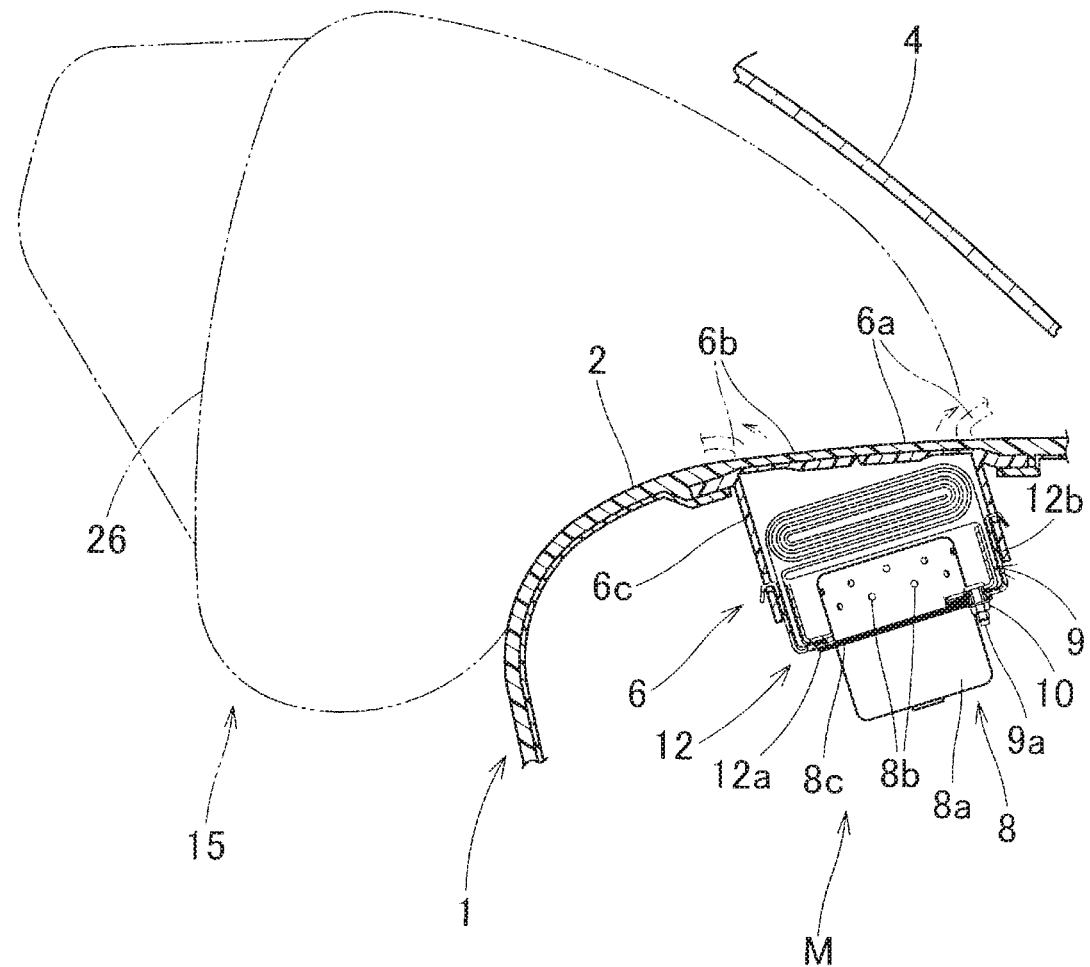
FIG. 1 is a schematic vertical section of an airbag device for a passenger seat embodying the invention as mounted on a vehicle.
Figure 2:
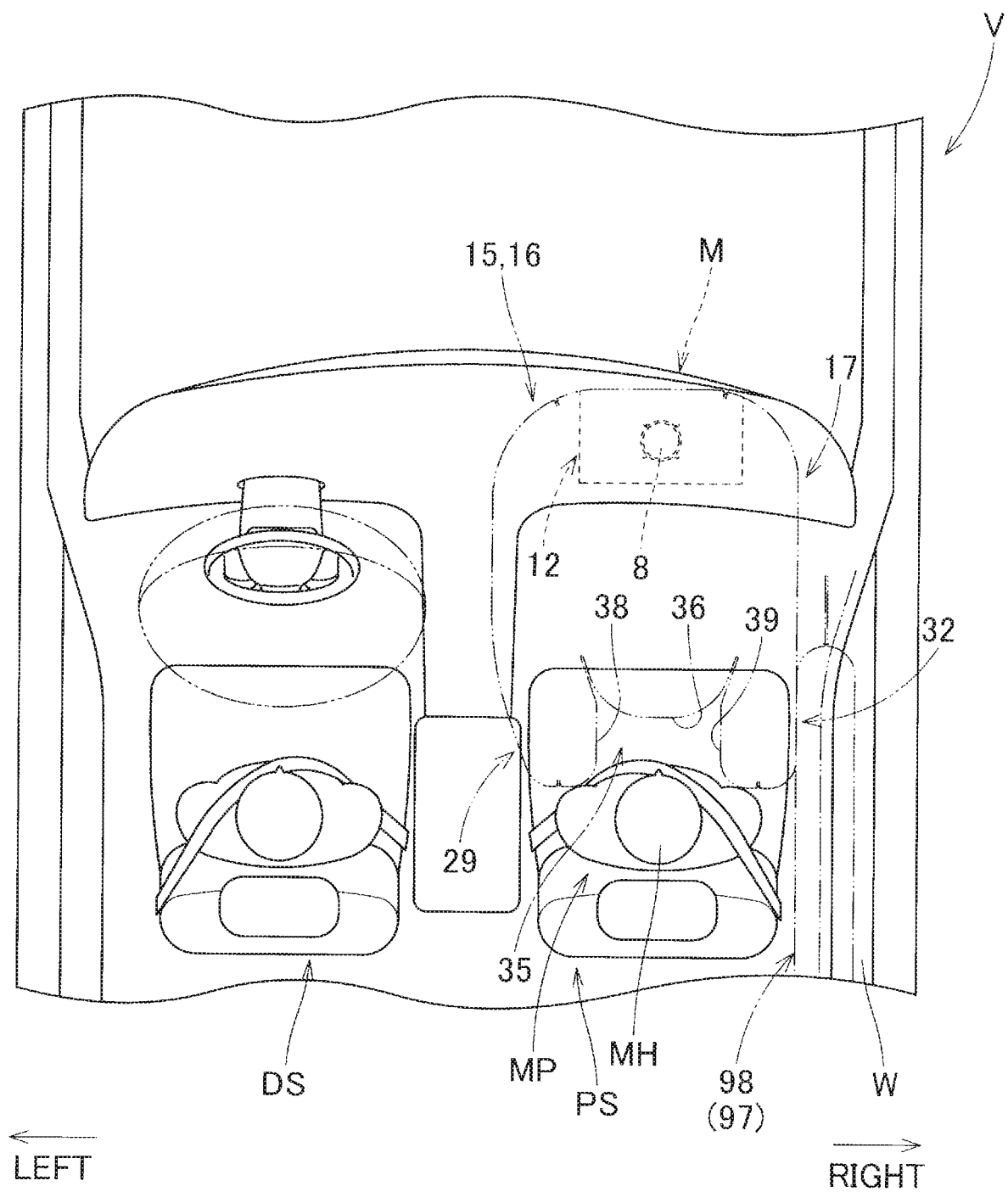
FIG. 2 is a schematic plan view of the airbag device of FIG. 1 as mounted on the vehicle.

FIGS. 1 and 2 depict an airbag device M for a passenger seat embodying the invention as mounted on a vehicle V. The airbag device M is a top-mount airbag device stored inside a top plane 2 of an instrument panel or dashboard 1 in front of a passenger seat PS of the vehicle V. Unless otherwise specified, front-rear, up-down and left-right directions in this specification are intended to refer to front-rear, up-down and left-right directions of the vehicle V.

As shown in FIG. 1, the airbag device M includes an airbag 15, which is folded up, an inflator 8 for supplying the airbag 15 with an inflation gas, a case or housing 12 for storing and holding the airbag 15 and inflator 8, a retainer 9 for mounting the airbag 15 and inflator 8 on the case 12, and an airbag cover 6 for covering the airbag 15 from above.

The airbag cover 6 is integral with the dashboard 1 which is made from synthetic resin, and includes two doors, i.e. front and rear doors 6a and 6b, which are designed to open when pushed by the airbag 15 upon airbag deployment. The airbag cover 6 further includes, around the doors 6a and 6b, a joint wall 6c which is coupled to the case 12.

As shown in FIG. 1, the inflator 8 includes a main body 8a which is formed into a generally pot-like shape and provided with a plurality of gas discharge ports 8b, and a flange 8c for attachment to the case 12. The inflator 8 of the illustrated embodiment is designed to be actuated in the event of a frontal collision, an oblique collision or an offset collision of the vehicle V.

As shown in FIG. 1, the case 12 is made of sheet metal into a generally rectangular parallelepiped with a rectangular opening at the top, and includes a generally rectangular bottom wall 12a which the inflator 8 is inserted into and mounted on from below, and a circumferential wall 12b which extends upward from an outer circumferential edge of the bottom wall 12a and is joined with the joint wall 6c of the airbag cover 6. The airbag 15 and inflator 8 are secured to the bottom wall 12a of the case 12 through the use of bolts 9a of the retainer 9 serving as mounting means. More specifically, the retainer 9 is located inside the airbag 15 such that the bolts 9a go through a periphery of a later-described gas inlet port 21 of the airbag 15, the bottom wall 12a of the case 12 and the flange 8c of the inflator 8, and the bolts 9a are fastened with nuts 10. Thus the airbag 15 and inflator 8 are mounted on the bottom wall 12a of the case 12. The bottom wall 12a of the case 12 has a width in a left and right direction greater than a width in a front and rear direction, and the inflator 8 is mounted generally at the center in the left and right direction of the bottom wall 12a. Further, not-shown brackets are provided on the bottom wall 12a of the case 12 for mounting on the vehicle body structure.

Referring to FIGS. 3 to 6, the airbag 15 includes a bag body 16 which is inflatable with an inflation gas, and tethers 55L, 55R and 72 which are disposed inside the bag body 16 for controlling a contour of the bag body 16 as fully inflated.

The bag body 16 is fabricated of a sheet material having flexibility. As shown in FIGS. 3 to 6, the bag body 16 of the illustrated embodiment includes a main inflatable section 17 and two protruding inflatable sections, i.e. a left protruding inflatable section 29 and a right protruding inflatable section 32, which are deployable in such a manner as to protrude rearward from the main inflatable section 17. Since the airbag device M of the illustrated embodiment is designed to be mounted on the vehicle V in which the passenger seat PS is located on the right side as shown in FIG. 2, the left protruding inflatable section 29 disposed towards the driver's seat DS constitutes an inboard-side protruding inflatable section while the right protruding inflatable section 32 disposed towards a window W, apart from the driver's seat DS, constitutes an outboard-side protruding inflatable section.

Figure 3:
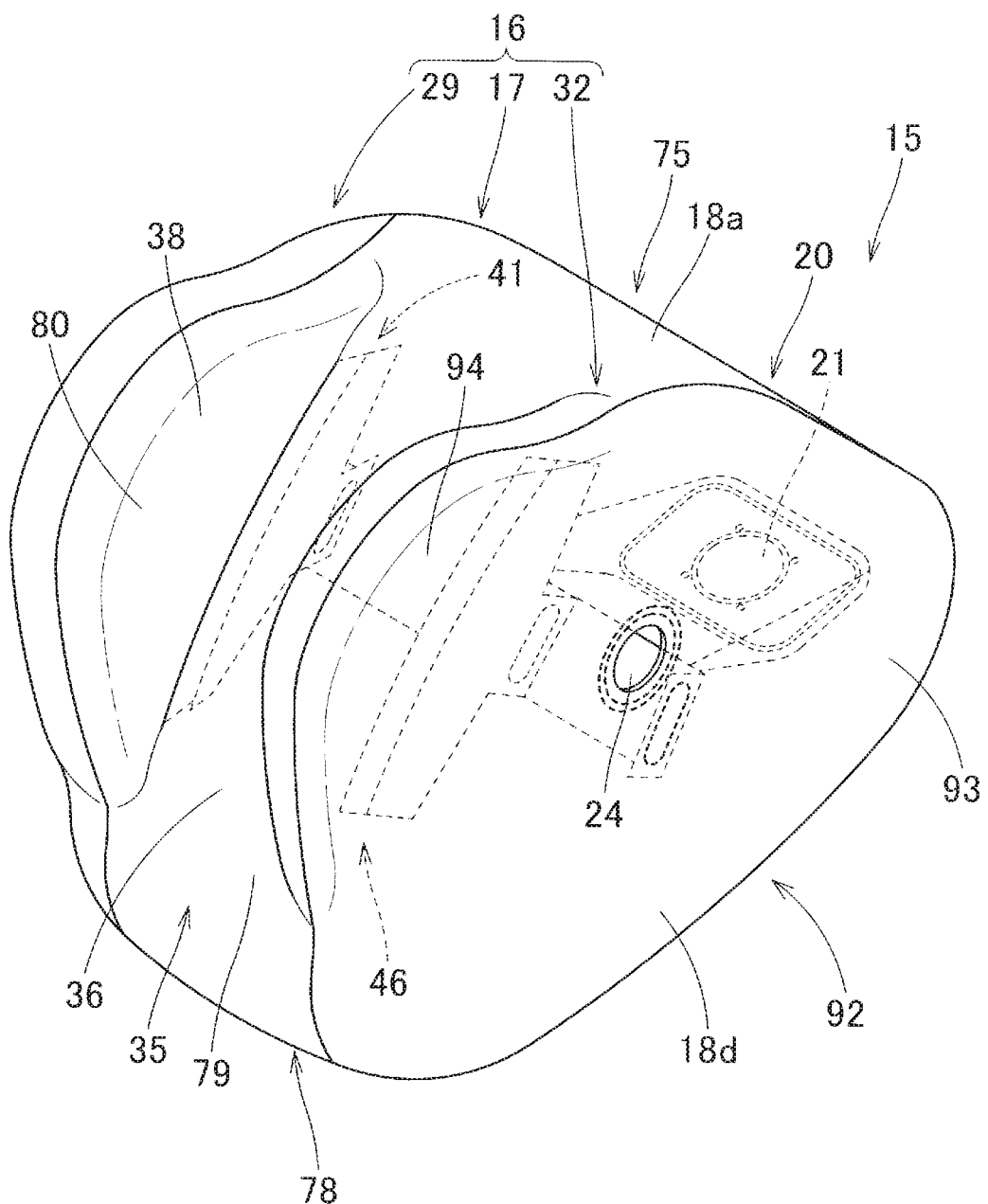
FIG. 3 is a perspective view of an airbag for use in the airbag device of FIG. 1 as inflated by itself, viewed from a right rear upper direction.
Figure 4:
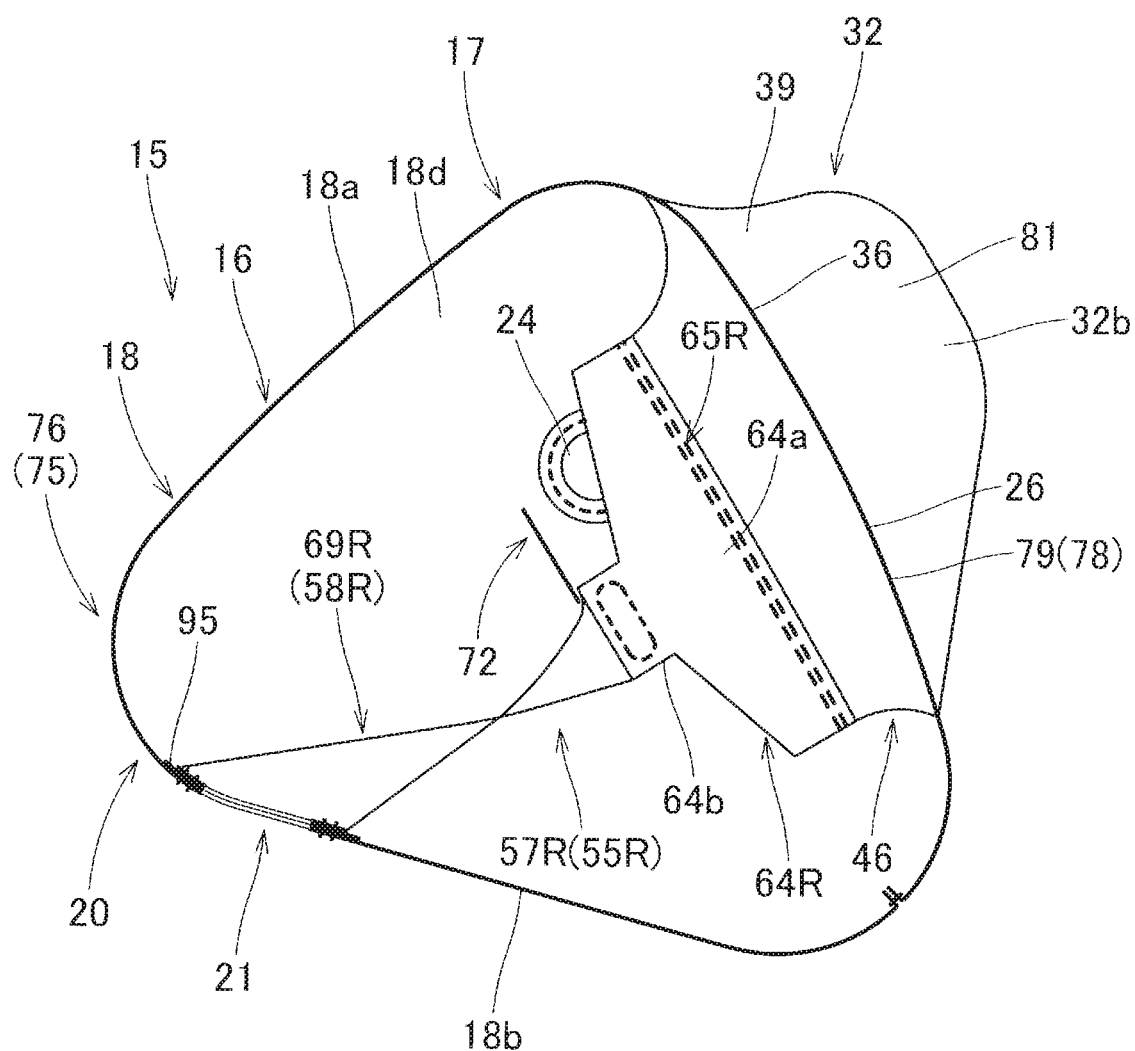
FIG. 4 is a schematic vertical section of the airbag of FIG. 3 as taken generally at the center in a left and right direction.
Figure 5:
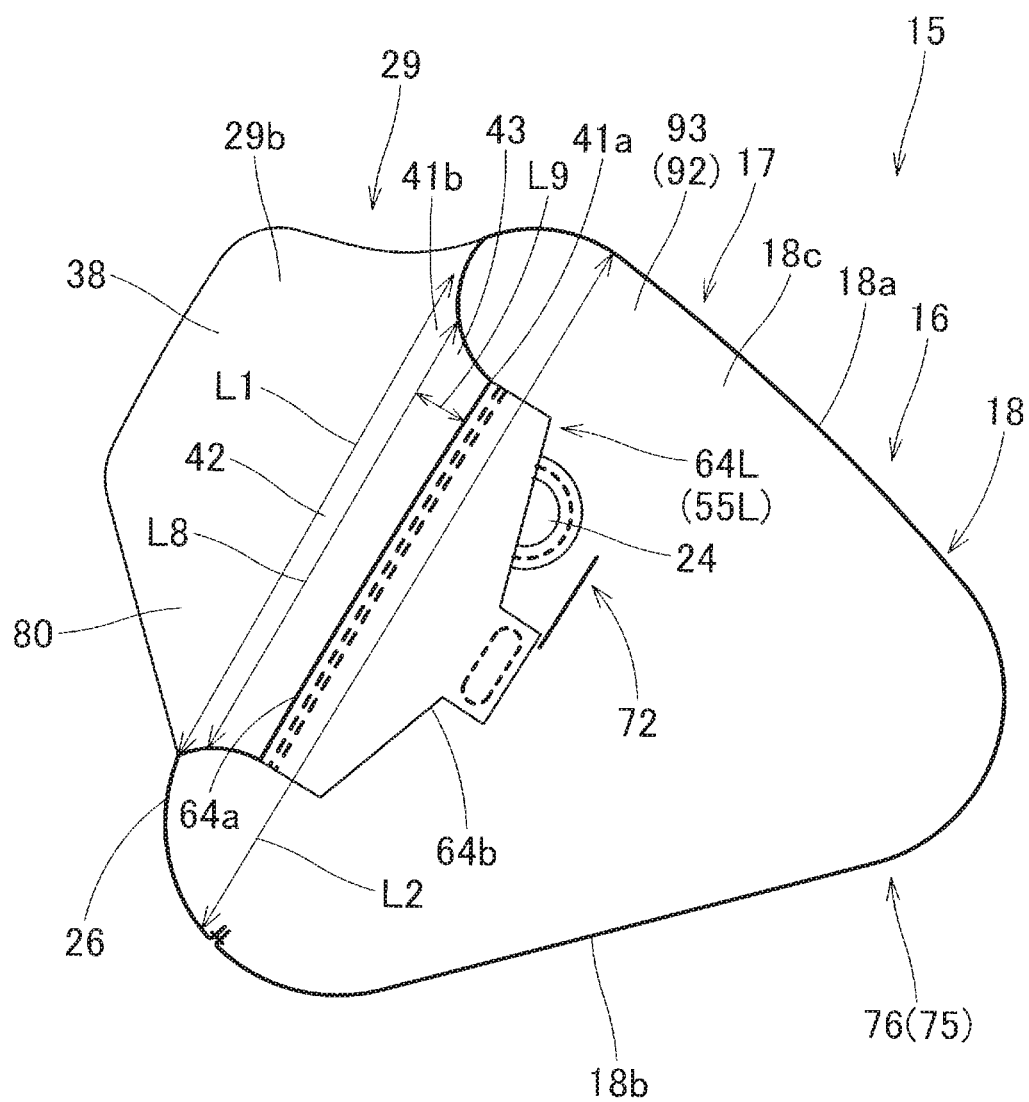
FIG. 5 is a schematic vertical section of the airbag of FIG. 3 taken at the location of a left arresting recess.
Figure 6:
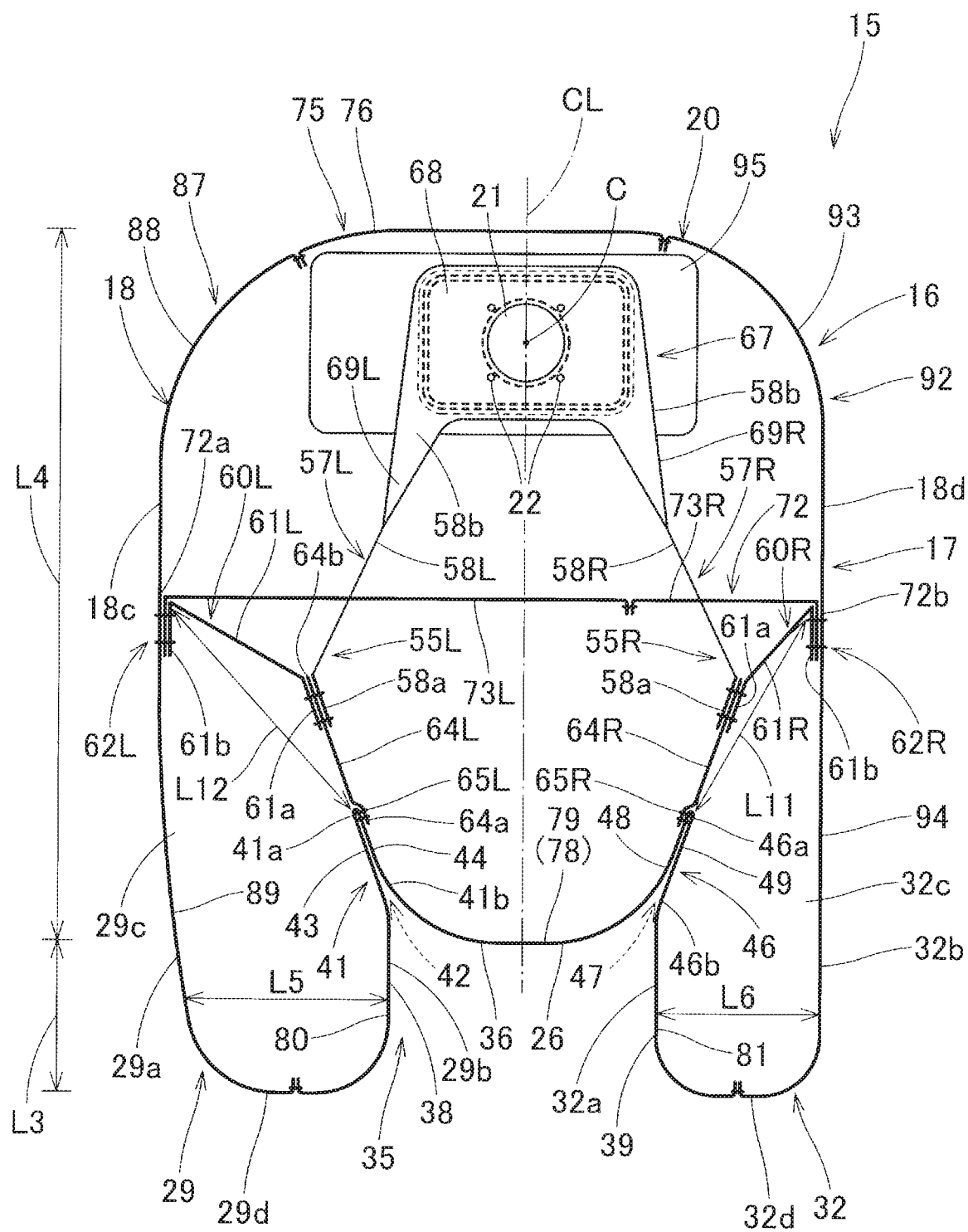
FIG. 6 is a schematic horizontal sectional view of the airbag of FIG. 3.
Figure 9:
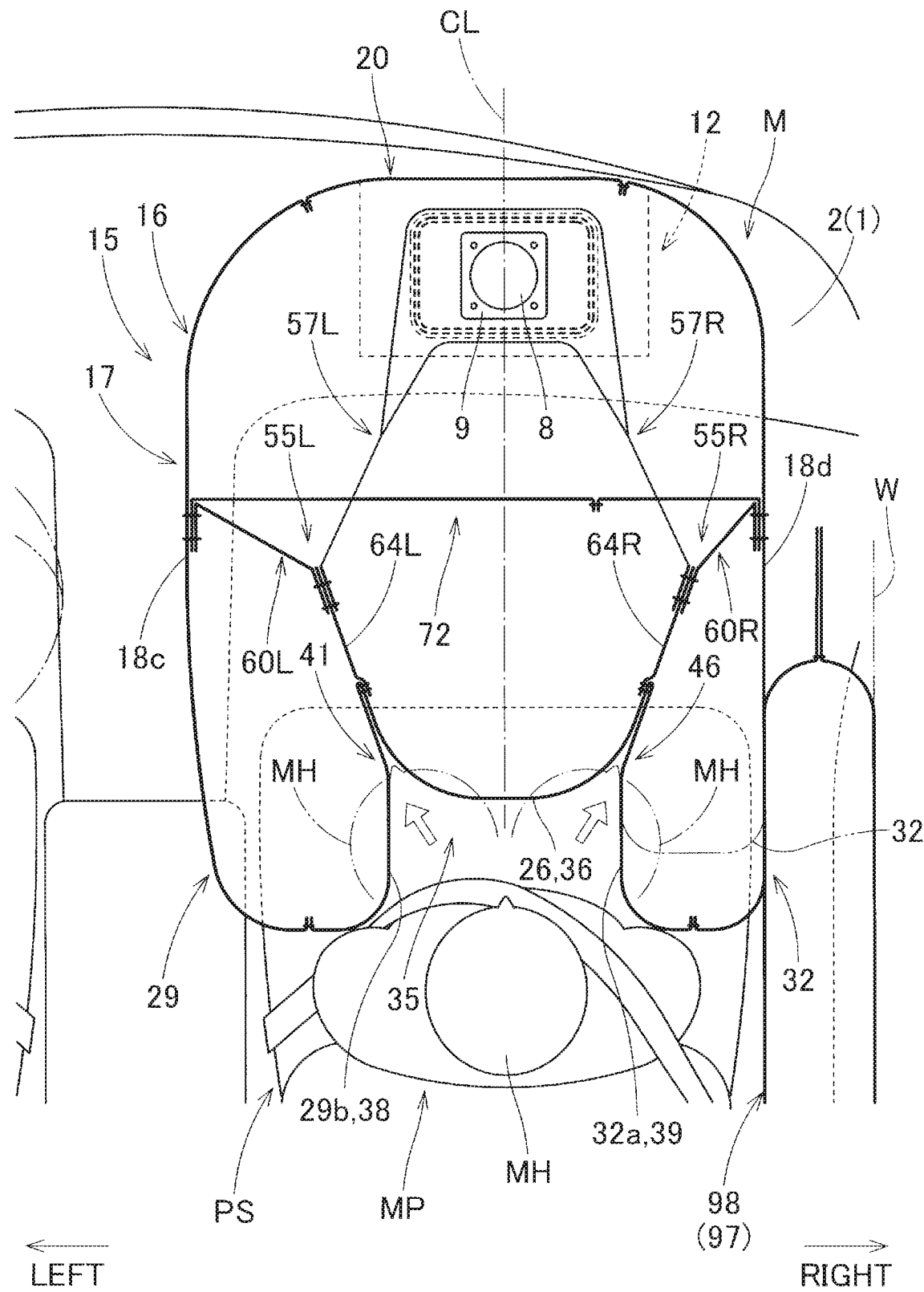
FIG. 9 is a schematic horizontal sectional view of the airbag device of FIG. 1 as has completed airbag deployment.
Figure 10:
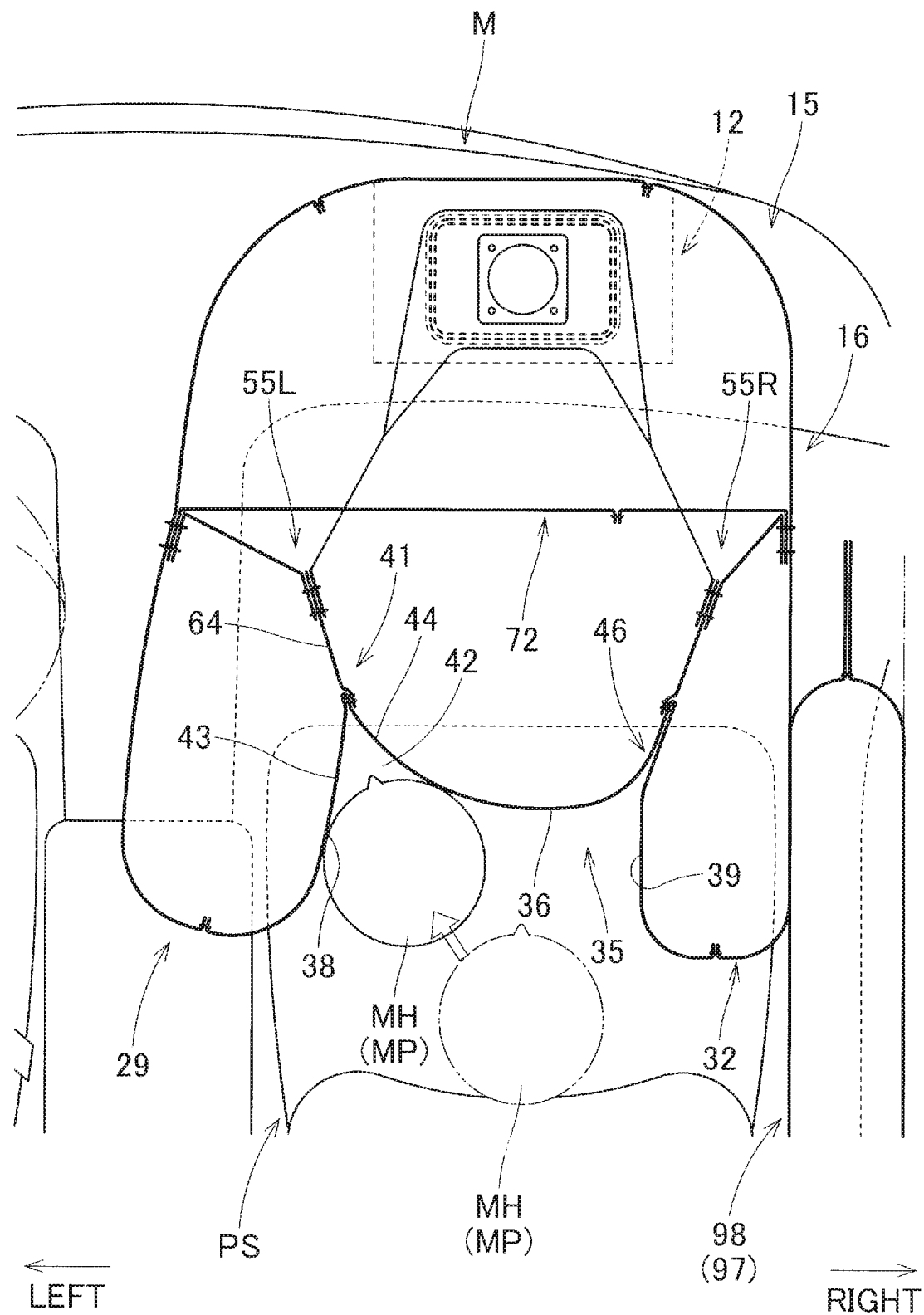
FIG. 10 is a schematic sectional view of the airbag device of FIG. 1 showing the way the airbag as deployed catches a passenger who has moved diagonally forward to the left.
Figure 11:
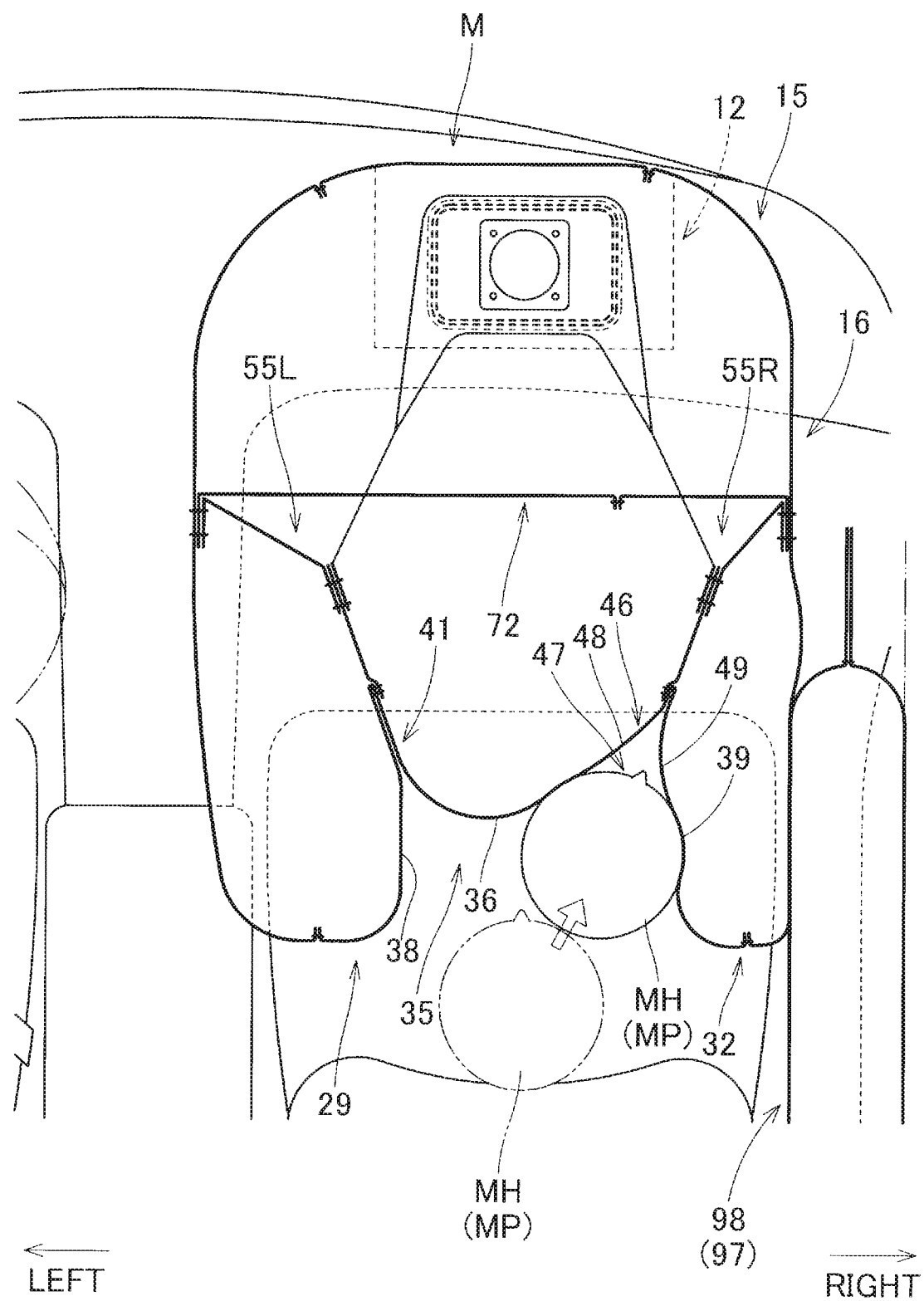
FIG. 11 is a schematic sectional view of the airbag device of FIG. 1 showing the way the airbag as deployed catches a passenger who has moved diagonally forward to the right.

The main inflatable section 17 is designed to be so deployed as to fill up a space between the top plane 2 of the dashboard 1 and the windshield 4, as indicated with double-dotted lines in FIG. 1. More specifically, as shown in FIGS. 3 to 5, an outer contour of the main inflatable section 17 as fully inflated is a generally triangular prism elongated generally in a left and right direction. As shown in FIG. 6, the main inflatable section 17 includes a mounting region 20 at the front end 17a portion as deployed, at which mounting region 20 the main inflatable section 17 is mounted on the case 12. That is, the airbag 15 is mounted on the case 12 by the front end 17a portion of the main inflatable section 17 as deployed. In the illustrated embodiment, the main inflatable section 17 is designed such that the left (or inboard-side) region slightly protrudes towards the driver's seat DS at airbag deployment, as shown in FIG. 9. The main inflatable section 17 includes a rear side wall 26 which is deployable at the rear to face a passenger MP and a circumferential wall 18 which extends forward from a circumferential edge of the rear side wall 26 while tapering in an up and down direction.

The circumferential wall 18 is designed to be deployable mainly in such a manner as to fill the space between the top plane 2 of the dashboard 1 and the windshield 4, and includes an upper wall 18a and a lower wall 18b which are opposed to each other in an up and down direction, and a left side wall 18c and a right side wall 18d which are opposed to each other in a left and right direction. In the airbag 15 of the illustrated embodiment, the front end portion of the circumferential wall 18 as deployed serves as the mounting region 20 at which the airbag 15 is mounted on the case 12. In the illustrated embodiment, the mounting region 20 as fully inflated is greater in width in a left and right direction than the case 12, as shown in FIG. 9. The mounting region 20 is provided, at its lower portion, i.e. in the lower wall 18b, with a generally round gas inlet port 21 for receiving an inflation gas, and a plurality of (four, in the illustrated embodiment) mounting holes 22 that are disposed in a periphery of the gas inlet port 21 for receiving the bolts 9a of the retainer 9, which secure the periphery of the gas inlet port 21 to the bottom wall 12a of the case 12. The gas inlet port 21 is disposed slightly to the right of the center in the left and right direction of the mounting region 20. As shown in FIGS. 6 and 9, in the illustrated embodiment, the airbag 15 is secured to the case 12 and mounted on the vehicle V such that a mounting center C, the center of the gas inlet port 21, falls on the center in a left and right direction of the passenger seat PS. A line which runs through the mounting center C in a front and rear direction will be called hereinafter a mounting center line CL, as can be seen in FIGS. 6 and 9. Each of the left side wall 18c and right side wall 18d of the circumferential wall 18 is provided with a vent hole 24 for releasing an extra inflation gas.

The rear side wall 26 is designed to be deployed generally vertically at the rear portion of the airbag 15 to face the passenger seat PS. The rear side wall 26 of the illustrated embodiment is deployable slightly at a slant relative to an up and down direction while curving such that the lower end is located farther rearward than the upper end as shown in FIGS. 1 (double-dotted lines) and 4. In a horizontal sectional view of the airbag 15 as deployed, the rear side wall 26 extends generally along the left and right direction, as shown in FIG. 6.

In the illustrated embodiment, the main inflatable section 17 is so designed that the width in the left and right direction as inflated is generally uniform from the front portion (i.e. the mounting region 20) to the rear portion (i.e. the rear side wall 26), such that the left side wall 18c and right side wall 18d extend generally along the front and rear direction at airbag inflation, as can be seen in FIGS. 6 and 9. As described above, the airbag 15 of the illustrated embodiment is secured to the case 12 and mounted on the vehicle V such that the mounting center C, i.e. the center of the gas inlet port 21 which is disposed to the right relative to the center in the left and right direction of the airbag 15, generally falls on the center in the left and right direction of the passenger seat PS. Accordingly, as can be seen in FIG. 6, when deployed as mounted on board, a portion of the main inflatable section 17 disposed to the left of the mounting center line CL (i.e. the line which runs through the mounting center C in the front and rear direction, FIGS. 6 and 9), in other words, a portion of the main inflatable section 17 disposed towards the driver's seat DS or disposed on an inboard side, has a greater width in the left and right direction than a portion of the main inflatable section 17 disposed to the right of the mounting center line CL (i.e. a portion facing away from the driver's seat DS or disposed on an outboard side). The left protruding inflatable section (i.e. inboard-side protruding inflatable section) 29 protrudes farther rearward than the rear side wall 26 from a left end portion of the rear side wall 26, and the right protruding inflatable section (i.e. outboard-side protruding inflatable section) 32 protrudes farther rearward than the rear side wall 26 from a right end portion of the rear side wall 26, at airbag deployment. Whereas the airbag 15 of the illustrated embodiment is designed such that a center in a left and right direction of the rear side wall 26 of the main inflatable section 17 (i.e. a later-described front-collision arresting plane 36) generally coincides with the mounting center line CL, the left protruding inflatable section 29 has a greater width in the left and right direction than that of the right protruding inflatable section 32, as described later. Thus the portion of the main inflatable section 17 disposed to the left of the mounting center line CL has the greater width in the left and right direction than the portion to the right of the mounting center line CL.

The left protruding inflatable section (i.e. inboard-side protruding inflatable section) 29 is located in the left end portion of the rear side wall 26, towards the driver's seat DS, so as to be deployed diagonally forward left of the passenger MP sitting in the passenger seat PS, as can be seen in FIG. 9. The left protruding inflatable section 29 is in gas communication with the main inflatable section 17 at the front end as deployed, such that an inflation gas is fed to the left protruding inflatable section 29 via the main inflatable section 17, as can be seen in FIG. 6. The left protruding inflatable section 29 is deployable into such a generally board-like contour that has a thickness in the left and right direction, and is trapezoidal as viewed from the left and right direction. More particularly, an outer contour of the left protruding inflatable section 29 as fully inflated is such a trapezoid that narrows towards the rear end 29d from the front end 29c (i.e. from the main inflatable section 17) as viewed from the left and right direction, as shown in FIG. 5. The left protruding inflatable section 29 includes a left side wall 29a and a right side wall 29b which are opposed to each other in the left and right direction as deployed. The left side wall 29a is continuous with the left side wall 18c of the circumferential wall 18 of the main inflatable section 17, as shown in FIG. 6.

The right protruding inflatable section (i.e. outboard-side protruding inflatable section) 32 is located in the right end portion of the rear side wall 26 apart from the driver's seat DS, so as to be deployed diagonally forward right of the passenger MP sitting in the passenger seat PS, as can be seen in FIG. 9. In a similar fashion to the left protruding inflatable section 29, the right protruding inflatable section 32 is in gas communication with the main inflatable section 17 at the front end as deployed, such that an inflation gas is fed to the right protruding inflatable section 29 via the main inflatable section 17, as can be seen in FIG. 6. The right protruding inflatable section 32 is also deployable into such a generally board-like contour that has a thickness in the left and right direction, and is trapezoidal as viewed from the left and right direction. More particularly, an outer contour of the right protruding inflatable section 32 as fully inflated is such a trapezoid that narrows towards the rear end 32d from the front end 32c (i.e. from the main inflatable section 17) as viewed from the left and right direction, as shown in FIG. 4. The right protruding inflatable section 32 includes a left side wall 32a and a right side wall 32b which are opposed to each other in the left and right direction as deployed. The right side wall 32b is continuous with the right side wall 18d of the circumferential wall 18 of the main inflatable section 17, as shown in FIG. 6.

In the illustrated embodiment, the left protruding inflatable section 29 and right protruding inflatable section 32 are generally equal in protruding amount from the rear side wall 26 as well as in deployed contour as viewed from the left and right direction, but different in thickness (more particularly, width in the left and right direction) as deployed. More specifically, the width in an up and down direction of the rear end 32d of the right protruding inflatable section 32 is slightly smaller than the width in an up and down direction of the rear end 29d of the left protruding inflatable section 29, as shown in FIGS. 4 and 5. To describe more particularly, as shown in FIG. 5, a width L1 in an up and down direction of the front end 29c/32c of each of the left protruding inflatable section 29 and right protruding inflatable section 32 as fully inflated is approximately two thirds of a width L2 in the up and down direction of the rear side wall 26 of the main inflatable section 17. A protruding amount L3 from the rear side wall 26 of each of the left protruding inflatable section 29 and right protruding inflatable section 32 as fully inflated, which can be paraphrased as a width in the front and rear direction of each of the left protruding inflatable section 29 and right protruding inflatable section 32, is approximately one sixth of a width L4 in the front and rear direction of the main inflatable section 17 as fully inflated, as shown in FIG. 6. A width L5 in the left and right direction of the left protruding inflatable section 29 as fully inflated is approximately seven fifth of a width L6 in the left and right direction of the right protruding inflatable section 32, as shown in FIG. 6. External dimensions of the left protruding inflatable section 29 are so determined as to be able to guide the head MH of a passenger MP into a later-described left arresting recess 41 smoothly when, at airbag deployment, the head MH bumps the right side wall 29b (i.e. a later-described left oblique-collision arresting plane 38) as he moves diagonally forward to the left. The width or thickness in the left and right direction of the right protruding inflatable section 32 as inflated is smaller than that of the left protruding inflatable section 29 because the right protruding inflatable section 32 is designed to be brought into contact with a later-described head-protecting airbag 98 (FIG. 9) which is deployed over a window W at a side of the passenger seat PS, when the head MH of the passenger MP bumps the right protruding inflatable section 32 at airbag deployment. To describe more precisely, in the illustrated embodiment, the right protruding inflatable section 32 is designed to be brought into contact with the head-protecting airbag 98 at airbag deployment even if the head MH does not contact the right protruding inflatable section 32, as shown in FIG. 9. External dimensions of the right protruding inflatable section 32 are so determined as to be able to guide the head MH of the passenger MP into a later-described right arresting recess 46 smoothly when, at airbag deployment, the head MH bumps the left side wall 32a (i.e. a later-described right oblique-collision arresting plane 39) as he moves diagonally forward to the right. Moreover, as shown in FIG. 9, the airbag 15 is designed such that a part of the left protruding inflatable section 29 is disposed at the rear of the case 12 at airbag deployment, in a horizontal sectional view taken along a front and rear direction. In the illustrated embodiment, as shown in FIG. 9, the right side wall 29b of the left protruding inflatable section 29 is disposed farther toward the right than a left end of the case 12. The left side wall 32a of the right protruding inflatable section 32 is disposed at the rear of a right end of the case 12, at airbag deployment.

In the airbag 15 of the illustrated embodiment, the left protruding inflatable section 29, right protruding inflatable section 32 and the rear side wall 26 of the main inflatable section 17 constitute a passenger protection region 35 which protects the passenger MP at airbag deployment. The passenger protection region 35 includes a front-collision arresting plane 36 which protects the head MH of the passenger MP as he moves forward in the event of a frontal collision of the vehicle V, a left oblique-collision arresting plane 38 and a right oblique-collision arresting plane 39 which protect the passenger's head MH as he moves diagonally forward in the event of an oblique collision or an offset collision of the vehicle V, and a left arresting recess 41 and a right arresting recess 46 which are formed between the front-collision arresting plane 36 and the left and right oblique-collision arresting plane 38 and 39.

In the illustrated embodiment, the front-collision arresting plane 36 is composed of an upper area of the rear side wall 26. In other words, the front-collision arresting plane 36 is composed of an area of the airbag 15 as inflated disposed between the left protruding inflatable section 29 and right protruding inflatable section 32. A width in the left and right direction of the front-collision arresting plane 36 is such as to be able to protect the head MH of the passenger MP smoothly. In the illustrated embodiment, the width in the left and right direction of the front-collision arresting plane 36 is slightly smaller than the width in the left and right direction of the case 12, as shown in FIG. 9. The left oblique-collision arresting plane 38, which is disposed on the left side (or towards the driver's seat DS or on an inboard side), is composed of the right side wall 29b of the left protruding inflatable section 29 which extends generally along the front and rear direction and faces towards the front-collision arresting plane 36 (i.e. rear side wall 26). The right oblique-collision arresting plane 39, which is disposed on the right side (or on an outboard side) apart from the driver's seat DS, is composed of the left side wall 32a of the right protruding inflatable section 32 which extends generally along the front and rear direction and faces towards the front-collision arresting plane 36 (i.e. rear side wall 26). That is, the left oblique-collision arresting plane 38 and right oblique-collision arresting plane 39 extend rearward from the front-collision arresting plane 36 generally along the front and rear direction at airbag deployment, as can be seen in FIG. 6. The lower area of the rear side wall 26 of the airbag 15 is to catch mainly a thorax of the passenger MP when the passenger protection region 35 arrests the head MH of the passenger MP in the event of a frontal collision, oblique collision or offset collision.

The left arresting recess 41 formed between the front-collision arresting plane 36 and left oblique-collision arresting plane 38 is provided for receiving and arresting therein the head MH of the passenger MP as moves diagonally forward to the left. In the illustrated embodiment, the left arresting recess 41 is formed generally along an up and down direction at the boundary of a right portion of the left protruding inflatable section 29 and the rear side wall 26 of the main inflatable section 17, as can be seen in FIGS. 3, 5 and 6. In the illustrated embodiment, the left arresting recess 41 is composed by pulling a flat surfaced portion of the bag body 16 forming the passenger protection region 35 (in other words, a later-described recess-forming portion 83, see FIG. 7) by a later-described left tether 55L. The left arresting recess 41 includes a left side wall 43 and a right side wall 44 which are opposed to each other, and an opening 42 at the rear end 41b. Although not depicted clearly in the drawings, at airbag deployment, the left arresting recess 41 is so deployed as to be sunken or recessed from the rear end 41b (i.e. the opening 42) like a pocket, in which the left side wall 43 and right side wall 44 push each other or squeeze together such that the rear end 41b (or opening 42) may not gape open. Moreover, as can be seen in FIG. 6, the left arresting recess 41 is designed to be deployed at a slant with respect to the front and rear direction such that the leading end or front end 41a points to the left (to an inboard direction).

The right arresting recess 46 formed between the front-collision arresting plane 36 and right oblique-collision arresting plane 39 is provided for receiving and arresting therein the head MH of the passenger MP as moves diagonally forward to the right. In the illustrated embodiment, the right arresting recess 46 is formed generally along an up and down direction at the boundary of a left portion of the right protruding inflatable section 32 and the rear side wall 26 of the main inflatable section 17, as can be seen in FIGS. 3, 4 and 6. In a similar fashion to the left arresting recess 41, the right arresting recess 46 is composed by pulling a flat surfaced portion of the bag body 16 forming the passenger protection region 35 (in other words, a later-described recess-forming portion 84, see FIG. 7) by a later-described right tether 55R. The right arresting recess 46 includes a left side wall 48 and a right side wall 49 which are opposed to each other, and an opening 47 at the rear end 46b. Although not depicted clearly in the drawings, at airbag deployment, the right arresting recess 46 is so deployed as to be sunken or recessed from the rear end 46b (i.e. the opening 47) like a pocket, in which the left side wall 48 and right side wall 49 push each other or squeeze together such that the rear end 46b (or opening 47) may not gape open. Moreover, as can be seen in FIG. 6, the right arresting recess 46 is designed to be deployed at a slant with respect to the front and rear direction such that the leading end or front end 46a points to the right (to an outboard direction).

In the illustrated embodiment, as can be seen in FIGS. 4 to 6, the airbag 15 is so designed that the left arresting recess 41 and right arresting recess 46 are deployed generally bilaterally symmetrically at deployment. A width in the up and down direction of each of the left arresting recess 41 and right arresting recess 46, which can be paraphrased as a width of the opening 42/47 in a vicinity of the rear end 41b/46b, is such as to receive the passenger's head MH smoothly. More specifically, a length L8 (FIG. 5) in the up and down direction of each of the left arresting recess 41 and right arresting recess 46 (i.e. the width of the opening 42/47) is approximately 400 mm, which is smaller than the width L1 in the up and down direction of each of the front end 29c and front end 32c of the left and right protruding inflatable section 29 and 32. A dimension L9 (FIG. 5) in the front and rear direction (i.e. depth) of each of the left arresting recess 41 and right arresting recess 46 is approximately 50 to 100 mm, which is enough to accommodate a front region of the passenger's head MH.

In the airbag 15 of the illustrated embodiment, a sunken or recessed contour of each of the left arresting recess 41 and right arresting recess 46 is formed by a left tether 55L and a right tether 55R which are disposed inside the bag body 16. As can be seen in FIG. 6, the left tether 55L includes a left front-rear connecting region 57L and a left sideways connecting region 60L, while the right tether 55R includes a right front-rear connecting region 57R and a right sideways connecting region 60R.

The left front-rear connecting region 57L and right front-rear connecting region 57R respectively connect the leading ends or front ends 41a and 46a of the left arresting recess 41 and right arresting recess 46 to a front end portion (i.e. a vicinity of the mounting region 20) of the bag body 16. More specifically, a front end 58b of each of the left front-rear connecting region 57L and right front-rear connecting region 57R is joined to the periphery of the gas inlet port 21 of the bag body 16, in other words, to a portion of the front end portion of the bag body 16 in front of a center in a left and right direction of the front-collision arresting plane 36. The left sideways connecting region 60L connects the leading end or front end 41a of the left arresting recess 41 to a side wall of the bag body 16 near the left oblique-collision arresting plane 38 (specifically, to the left side wall 18c of the circumferential wall 18 of the main inflatable section 17). The right sideways connecting region 60R connects the leading end or front end 46a of the right arresting recess 46 to a side wall of the bag body 16 near the right oblique-collision arresting plane 39 (specifically, to the right side wall 18d of the circumferential wall 18 of the main inflatable section 17). In the illustrated embodiment, the left front-rear connecting region 57L and left sideways connecting region 60L of the left tether 55L have a region that extends from the leading end or front end 41a of the left arresting recess 41 in common, as a common region 64L, and bifurcate from a front end 64b of the common region 64L. Bifurcated regions respectively serve as main bodies 58L and 61L. The right front-rear connecting region 57R and right sideways connecting region 60R have a region that extends from the leading end or front end 46a of the right arresting recess 46 in common, as a common region 64R, and bifurcate from a front end 64b of the common region 64R. Bifurcated regions respectively serve as main bodies 58R and 61R.

Figure 7:
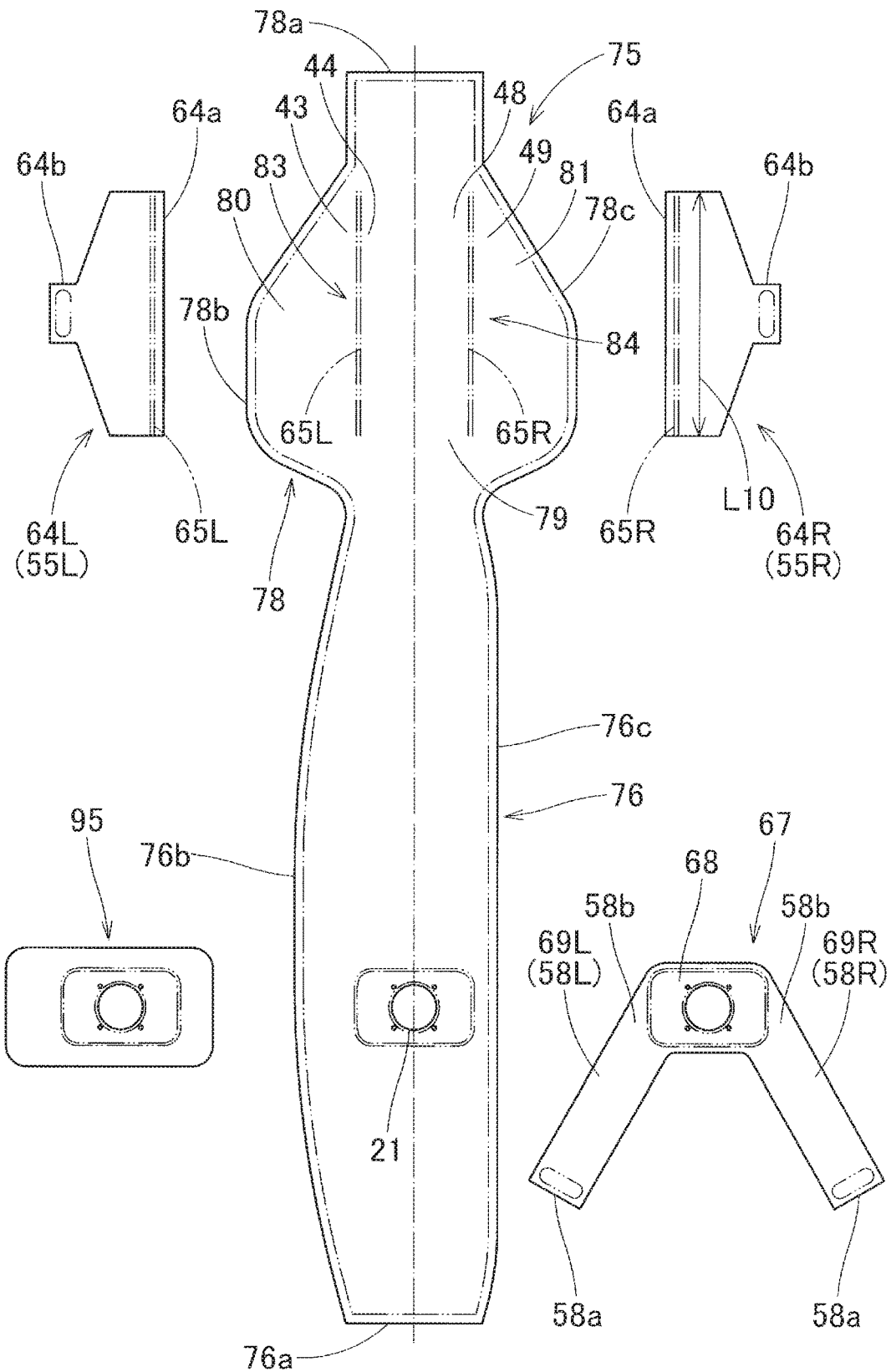
FIGS. 7 and 8 depict base members of the airbag of FIG. 3 by plan views.

As shown in FIGS. 4, 5 and 7, each of the common regions 64L and 64R is formed into a generally band shape having a great width. A root region (or rear end region) 64a of the common region 64L is generally wholly joined to a vicinity of the boundary between the right side wall 29b of the left protruding inflatable section 29 and the rear side wall 26 of the main inflatable section 17 by a joint region 65L, while a root region (or rear end region) 64a of the common region 64R is generally wholly joined to a vicinity of the boundary between the left side wall 32a of the right protruding inflatable section 32 and the rear side wall 26 of the main inflatable section 17 by a joint region 65R. Each of the common regions 64L and 64R tapers towards the leading end or front end 64b. In the illustrated embodiment, as shown in FIGS. 4 to 6, each of the joint regions 65L and 65R, which connects the rear end 64a of each of the common regions 64L and 64R to a later-described center panel 75, forms the leading end or front end 41a/46a of the left arresting recess 41/right arresting recess 46 at airbag deployment. In the illustrated embodiment, the common regions 64L and 64R are identical in outer contour. A width in an up and down direction of the rear end 64a of each of the common regions 64L and 64R defines the length in the up and down direction of each of the left arresting recess 41 and right arresting recess 46 at airbag deployment. In the illustrated embodiment, a width L10 (FIG. 7) in the up and down direction of the rear end 64a of each of the common regions 64L and 64R is 400 mm.

The main bodies 58L and 58R of the left front-rear connecting region 57L and right front-rear connecting region 57R of the illustrated embodiment are composed of a single tether base cloth 67 depicted in FIG. 7. The tether base cloth 67 includes a joint section 68 which is shared by both of the front-rear connecting regions 57L and 57R and joined to the periphery of the gas inlet port 21, and two band sections 69L and 69R each of which extends diagonally with respect to a front and rear direction from the joint section 68, thus the base cloth 67 has a generally bilaterally symmetric contour as developed flatly. The joint section 68 is provided with a number of openings (reference numerals omitted) which correspond to the gas inlet port 21 and mounting holes 22 of the airbag 15. The band sections 69L and 69R respectively form the main bodies 58L and 58R of the left front-rear connecting region 57L and right front-rear connecting region 57R, which main bodies 58L and 58R are respectively joined to the front ends 64b of the common regions 64L and 64R by the rear ends 58a. In a flattened state of the base cloth 67, the band sections 69L and 69R (i.e. main bodies 58L and 58R) are formed to be diagonal with respect to a front and rear direction in such a manner as to draw away from each other towards the rear ends 58a. As can be seen in FIG. 6, the band sections 69L and 69R are also deployed diagonally with respect to the front and rear direction such that the rear ends 58a are directed outwardly in the left and right direction. A length of each of the band sections 69L and 69R is such as to be able to pull the left arresting recess 41 and right arresting recess 46 forward at airbag deployment. That is, the left front-rear connecting region 57L and right front-rear connecting region 57R are deployed generally bilaterally symmetrically at deployment of the bag body 16, and respectively pull the left arresting recess 41 and right arresting recess 46 forward at deployment of the airbag 15.

Figure 8:
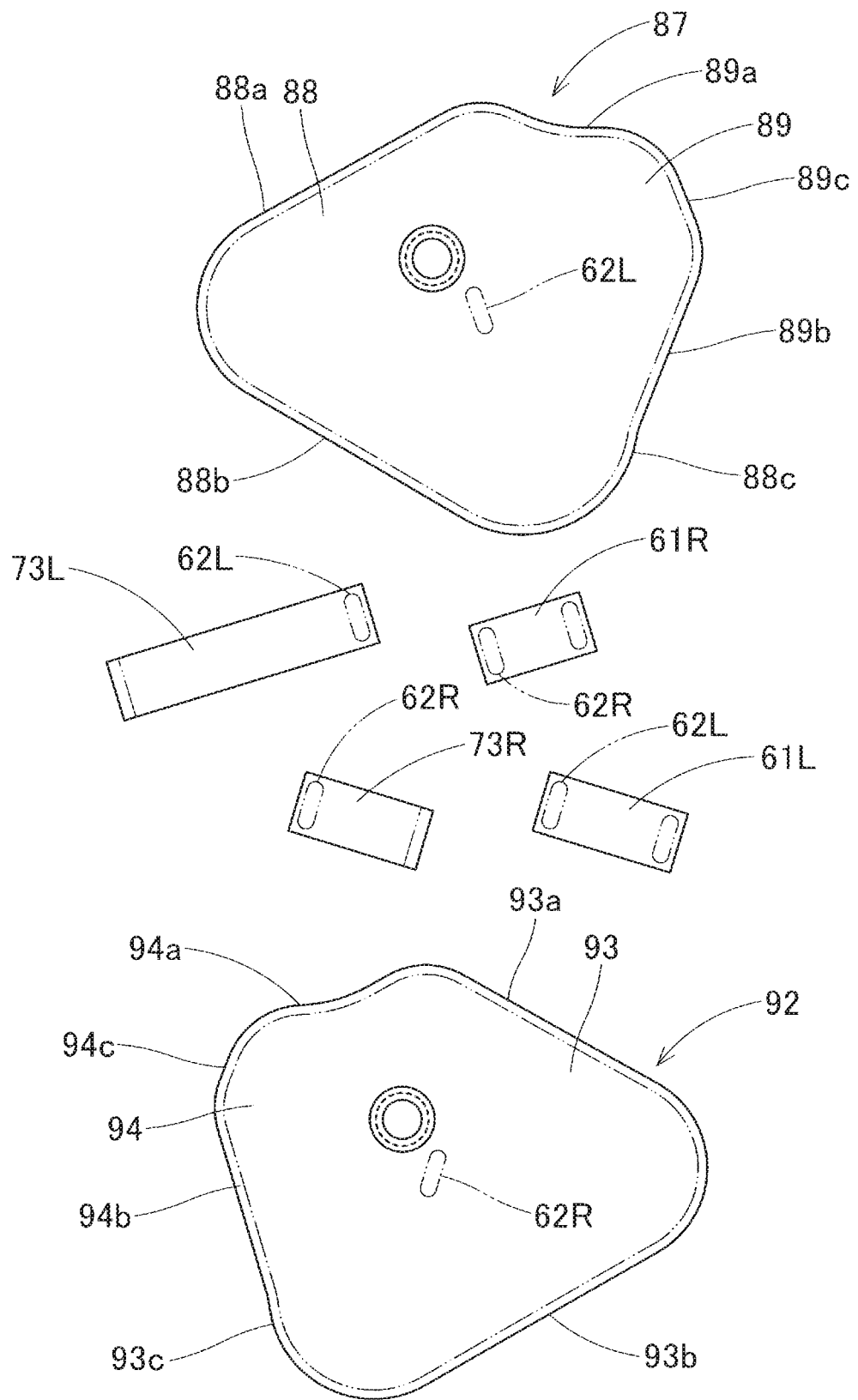

In the illustrated embodiment, each of the main bodies 61L and 61R of the left sideways connecting region (namely, an inboard-side sideways connecting region) 60L and right sideways connecting region (namely, an outboard-side sideways connecting region) 60R is formed into a band shape, as can be seen in FIG. 8. In the illustrated embodiment, as shown in FIGS. 6 and 8, the main body 61L forming the left sideways connecting region (i.e. the inboard-side sideways connecting region) 60L has a longer length than that of the main body 61R forming the right sideways connecting region (i.e. the outboard-side sideways connecting region) 60R. The main bodies 61L and 61R of the left sideways connecting region 60L and right sideways connecting region 60R are designed to be deployed generally along a horizontal direction, not diagonally with respect to the horizontal direction, at airbag deployment. The main body 61R of the right sideways connecting region 60R has such a length that is able to limit a rightward protruding amount of a right portion of the main inflatable section 17 (in other words, a portion of the main inflatable section 17 in a vicinity of the right side wall 18d) such that the portion may not push too much the head-protecting airbag 98, which is deployed over the window W at a side of the passenger seat PS, at airbag deployment. The main bodies 61L and 61R are respectively joined to the left side wall 18c and right side wall 18d of the main inflatable section 17 by the ends apart from the common regions 64L and 64R, i.e. by the leading ends 61b, such that the leading ends 61b are directed diagonally forward and outwardly in the left and right direction at deployment of the bag body 16. That is, as can be seen in FIG. 6, a joint 62L that joins the end (i.e. the leading end 61b) of the main body 61L (in other words, an end of the left sideways connecting region 60L) to the left side wall 18c is located farther forward than the leading end or front end 41a of the left arresting recess 41 at airbag deployment, and a joint 62R that joins the end (i.e. the leading end 61b) of the main body 61R (in other words, an end of the right sideways connecting region 60R) to the right side wall 18d is located farther forward than the leading end or front end 46a of the right arresting recess 46 at airbag deployment. In the illustrated embodiment, more specifically, the joint 62L that joins the left main body 61L (i.e. the left sideways connecting region 60L serving as the inboard-side connecting region) to the left side wall 18c and the joint 62R that joins the right main body 61R (i.e. the right sideways connecting region 60R serving as the outboard-side sideways connecting region) to the right side wall 18d are located generally at same positions in the front and rear direction and in the up and down direction, at airbag deployment. In the illustrated embodiment, each of the joints 62L and 62R joins a first and a second end 72a and 72b of a later-described transverse tether 72 to the left side wall 18c and right side wall 18d together, as can be seen in FIGS. 6 and 8. In the airbag 15 of the illustrated embodiment, as shown in FIG. 6, a substantial length of the right sideways connecting region (outboard-side sideways connecting region) 60R, which equals to a distance L11 between the joint 62R and the leading end or front end 46a of the right arresting recess 46 at airbag deployment, is smaller than a substantial length of the left sideways connecting region (inboard-side sideways connecting region) 60L, which equals to a distance L12 between the joint 62L and the leading end or front end 41a of the left arresting recess 41 at airbag deployment. Each of the left sideways connecting region 60L and right sideways connecting region 60R mainly regulates a width or thickness in the left and right direction of the left protruding inflatable section 29/right protruding inflatable section 32 as inflated as well as pulls the leading end or front end 41a/46a of the left arresting recess 41/right arresting recess 46 towards the left side wall 18c/right side wall 18d, at airbag deployment. In the illustrated embodiment, lengths of the left sideways connecting region 60L and right sideways connecting region 60R are so determined as to deploy the left arresting recess 41 and right arresting recess 46 generally bilaterally symmetrically at deployment of the bag body 16.

That is, the left tether 55L includes the left front-rear connecting region 57L and the left sideways connecting region 60L which bifurcate from the leading end or front end 41a of the left arresting recess 41, while the right tether 55R includes the right front-rear connecting region 57R and the right sideways connecting region 60R which bifurcate from the leading end or front end 46a of the right arresting recess 46. The left front-rear connecting region 57L and the left sideways connecting region 60L work together to deploy the left arresting recess 41 diagonally with respect to the front and rear direction such that the leading end or front end 41a point to the left front and the left side wall 43 and right side wall 44 are kept in close contact with each other at airbag deployment, as shown in FIG. 6. Likewise, the right front-rear connecting region 57R and the right sideways connecting region 60R work together to deploy the right arresting recess 46 diagonally with respect to the front and rear direction such that the leading end or front end 46a point to the right front and the left side wall 48 and right side wall 49 are kept in close contact with each other at airbag deployment. More specifically, pulled by the left tether 55L1 right tether 55R, each of the left arresting recess 41 and right arresting recess 46 is sunken or recessed generally along a travel direction of the head MH of the passenger MP which moves diagonally forward, at airbag deployment, as can be seen in FIG. 9.

The airbag 15 of the illustrated embodiment further includes a transverse tether 72 inside the main inflatable section 17 of the bag body 16. The transverse tether 72 connects the left side wall 18c and right side wall 18d of the bag body 16 in order to limit a clearance between the left side wall 18c and right side wall 18d and controls a contour of the main inflatable section 17 as inflated. More specifically, at airbag deployment, the transverse tether 72 is disposed generally along the left and right direction above the left front-rear connecting region 57L of the left tether 55L and right front-rear connecting region 57R of the right tether 55R, as shown in FIGS. 4 and 5. As described above, the first end 72a and second end 72b of the transverse tether 72 are respectively joined to the left side wall 18c and right side wall 18d of the bag body 16 by the joints 62L and 62R, together with the leading ends 61b of the main bodies 61L and 61R of the left and right sideways connecting regions 60L and 60R. In the illustrated embodiment, the transverse tether 72 is composed of two band-shaped tether base cloths 73L and 73R, as shown in FIG. 8. In the illustrated embodiment, the left base cloth 73L and right base cloth 73R are not equal in length, the left base cloth 7L is longer than the right base cloth 73R. By limiting the clearance between the left side wall 18c and right side wall 18d of the bag body 16, the transverse tether 72 prevents the bag body 16 from oscillating in a front and rear direction and in a left and right direction at airbag deployment, thus helps inflate the bag body 16 quickly.

The bag body 16 is formed by sewing together circumferential edges of predetermined shaped base members. In the illustrated embodiment, as shown in FIGS. 7 and 8, the bag body 16 is composed of three base members; a center panel 75 forming a central area of the bag body 16, a left panel 87 deployable on the left side, and a right panel 92 deployable on the right side.

Referring to FIG. 7, the center panel 75 is formed generally into a band elongated in a front and rear direction, and includes a circumference-forming region 76 which forms the upper wall 18a and lower wall 18b of the circumferential wall 18, and a protection-region-forming region 78 which forms the passenger protection region 35 (more specifically, the rear side wall 26, the right side wall 29b of the left protruding inflatable section 29 and the left side wall 32a of the right protruding inflatable section 32). In the illustrated embodiment, the center panel 75 has such a band shape that an upper end of the protection-region-forming region 78 and a rear end of the circumference-forming region 76 are joined together. In the illustrated embodiment, the circumference-forming region 76 has an asymmetric contour in which the area in a vicinity of the left edge 76b protrudes towards the left in a larger way than the area in a vicinity of the right edge 76c protrudes towards the right.

The protection-region-forming region 78 includes a central region 79 which forms the rear side wall 26 (i.e. front-collision arresting plane 36), a left region 80 which protrudes towards the left from the central region 79 and forms the right side wall 29b of the left protruding inflatable section 29 (i.e. left oblique-collision arresting plane 38), and a right region 81 which protrudes towards the right from the central region 79 and forms the left side wall 32a of the right protruding inflatable section 32. The left region 80 and right region 81 are each formed into a generally trapezoidal contour, and a width in a left and right direction of the right region 81 as developed flatly is slightly smaller than that of the left region 80. Rear end regions 64a of the common regions 64L and 64R of the left tether 55L and right tether 55R are respectively joined to a vicinity of a boundary between the left region 80 and central region 79 and to a vicinity of a boundary between the right region 81 and central region 79 with the joint regions 65L and 65R each of which extending in an up and down direction. An area around the boundary between the left region 80 and central region 79 and an area around the boundary between the right region 81 and central region 79 respectively constitute a recess-forming region 83 and a recess-forming region 84 (FIG. 7) which are respectively pulled by the left tether 55L and right tether 55R and form the left arresting recess 41 and right arresting recess 46 at airbag deployment.

The left panel 87 forms the left side wall 18c of the main inflatable section 17 and the left side wall 29a of the left protruding inflatable section 29. As shown in FIG. 8, the left panel 87 has such a contour that a generally trapezoidal protruding region 89 for forming the left side wall 29a of the left protruding inflatable section 29 is connected to a rear end of a generally triangular main body 88 for forming the left side wall 18c of the main inflatable section 17. The protruding region 89 is generally identical in outer contour to the left region 80 of the protection-region-forming region 78 of the center panel 75. The right panel 92 forms the right side wall 18d of the main inflatable section 17 and the right side wall 32b of the right protruding inflatable section 32. As shown in FIG. 8, the right panel 92 has such a contour that a generally trapezoidal protruding region 94 for forming the right side wall 32b of the right protruding inflatable section 32 is connected to a rear end of a generally triangular main body 93 for forming the right side wall 18d of the main inflatable section 17. The protruding region 94 is generally identical in outer contour to the right region 81 of the protection-region-forming region 78 of the center panel 75.

In the illustrated embodiment, components of the bag body 16, i.e. the center panel 75, left panel 87, and right panel 92, components of the left tether 55L and right tether 55R, i.e. main bodies 61L and 61R, common regions 64L and 64R, and base member 67, and tether base members 73L and 73R for forming the transverse tether 72 are made of a flexible woven fabric of polyester yarn, polyamide yarn or the like.

As shown in FIGS. 7 and 8, the bag body 16 of the illustrated embodiment is formed by sewing (jointing) corresponding circumferential edges of the center panel 75, left panel 87 and right panel 92 together with sewing threads. More specifically, the left edge 76b of the circumference-forming region 76 of the center panel 75 is joined to an upper edge 88a and lower edge 88b of the main body 88 of the left panel 87. The right edge 76c of the circumference-forming region 76 is joined to an upper edge 93a and lower edge 93b of the main body 93 of the right panel 92. A rear edge 76a of the circumference-forming region 76 is joined to a lower edge 78a of the protection-region-forming region 78. A left edge 78b of the protection-region-forming region 78 is joined to the rear edge 88c of the main body 88 and to an upper edge 89a, lower edge 89b and rear edge 89c of the protruding region 89, in the left panel 87. A right edge 78c of the protection-region-forming region 78 is joined to the rear edge 93c of the main body 93 and to an upper edge 94a, lower edge 94b and rear edge 94c of the protruding region 94, in the right panel 92.

The vehicle V on which the airbag device M for a passenger seat of the illustrated embodiment is mounted also includes a head-protecting airbag device 97 in an upper edge of the window W disposed at a side of the passenger seat PS. Although not depicted in the drawings in detail, the head-protecting airbag device 97 includes a head-protecting airbag 98 which is stored in the upper edge of the window W in a folded-up configuration, and a not-shown inflator for feeding the airbag 98 with inflation gas. The airbag 98 is composed of a flexible sheet material, and is designed to be inflated with the inflation gas fed from the inflator and deployed over the window W in an interior of the vehicle V, as can be seen in FIG. 2 (with double-dotted lines) and in FIG. 9. Similarly to the inflator 8 of the airbag device M of the illustrated embodiment, the inflator of the head-protecting airbag device 97 is designed to be actuated in the event of a frontal collision, an oblique collision or an offset collision of the vehicle V.

Mounting of the airbag device M on the vehicle V is now described. Firstly, the retainer 9 is housed inside the airbag 15, and the airbag 15 is folded up for storage in the case 12. Then a breakable wrapping sheet is wrapped around the airbag 15 for keeping the folded-up configuration. Then the airbag 15 is placed on the bottom wall 12a of the case 12, and the main body 8a of the inflator 8 is set in the case 12 from the lower side of the bottom wall 12a, such that the bolts 9a of the retainer 9 projecting downwardly out of the bottom wall 12a are put through the flange 8c of the inflator 8. If then the bolts 9a projecting out of the flange 8c of the inflator 8 are fastened with nuts 10, the airbag 15 and the inflator 8 are mounted on the case 12. Thereafter, the circumferential wall 12b of the case 12 is attached to the joint wall 6c of the airbag cover 6 on the dashboard 1, which has been mounted on board as an integral part of the dashboard 1, and the not-shown brackets of the case 12 are secured to the vehicle body structure. If then the inflator 8 is electrically connected to a not-shown control device, the airbag device M for a passenger seat is mounted on the vehicle V.

After the airbag device M of the illustrated embodiment is mounted on the vehicle V, in the event of a frontal collision, an oblique collision or an offset collision of the vehicle V, the inflator 8 discharges an inflation gas from the gas discharge ports 8b to inflate the airbag 15. Then the airbag 15 pushes and opens the doors 6a and 6b of the airbag cover 6, protrudes upward from the case 12 via an opening formed by the opening of the doors 6a and 6b, and is deployed rearward and completes inflation in such a manner as to fill the space between the top lane 2 of the dashboard 1 and the windshield 4, as indicated by double-dotted lines in FIGS. 1 and 2 and as shown in FIG. 9. At this time, the head-protecting airbag 98 is also deployed over the window W as shown in FIG. 9.

In the airbag device M of the illustrated embodiment, the left tether 55L and right tether 55R that respectively make the left arresting recess 41 and right arresting recess 46 recessed at airbag deployment each include the front-rear connecting region (i.e. the left front-rear connecting region 57L/the right front-rear connecting region 57R) and the sideways connecting region (i.e. the left sideways connecting region 60L/the right sideways connecting region 60R) which extend from the leading end or front end 41a/46a of the left arresting recess 41/right arresting recess 46 in a bifurcating fashion. Since the end 58b of the front-rear connecting region 57L/57R and the end 61b of the sideways connecting region 60L/60R are joined to positions in the bag body 16 which are apart from each other in the left and right direction in both of the left tether 55L and right tether 55R, the front-rear connecting region (i.e. the left front-rear connecting region 57L/the right front-rear connecting region 57R) and the sideways connecting region (i.e. the left sideways connecting region 60L/the right sideways connecting region 60R) are able to make the arresting recess (i.e. the left arresting recess 41/right arresting recess 46) recessed steadily such that the leading end or front end 41a/46a is directed forward. More specifically, in the airbag device M of the illustrated embodiment, due to cooperation of the front-rear connecting region (i.e. the left front-rear connecting region 57L/the right front-rear connecting region 57R) whose end (i.e. front end) 58b is connected to a portion of the front end portion of the bag body 16 in front of the center in the left and right direction of the front-collision arresting plane 36 (to the periphery of the gas inlet port 21, in the illustrated embodiment) and the sideways connecting region (i.e. the left sideways connecting region 60L/the right sideways connecting region 60R) whose joint (i.e. the joint 62L/62R) to the side wall (i.e. left side wall 18c/right side wall 18d) is located farther forward than the leading end or front end 41a/46a of the arresting recess 41/46, especially the sideways connecting region 60L/60R helps make a circumferential portion extending from the joint 62L/62R to the side wall 18c/18d to the leading end 41a/46a of the arresting recess 41/46 inflated, which will act such that the opposing walls (i.e. opposing walls 43 and 44/48 and 49) of the arresting recess 41/46 push each other. Accordingly, as shown in FIG. 9, each of the arresting recesses 41 and 46 will be deployed diagonally with respect to the front and rear direction while staying closed, generally along the travel direction of the head MH of the passenger MP which moves diagonally forward. An inclination angle of each of the arresting recesses 41 and 46 can be adequately changed by changing the length of the sideways connecting region (i.e. the left sideways connecting region 60L/the right sideways connecting region 60R) and/or the position of the joint of the sideways connecting region to the side wall 18c/18d. When the arresting recess 41/46 configured as described above receives a diagonally-moving passenger's head MH, the head MH will go into the arresting recess 41/46 in a squeezing fashion, thus the arresting recess 41/46 will be able to arrest the head MH in a balanced fashion with the opposing walls (the left side wall 43 and right side wall 44/the left side wall 48 and right side wall 49). Accordingly, the airbag 15 will be able to absorb a kinetic energy of the diagonally-moving head MH and arrest the head MH softly by receiving the head MH in the arresting recess 41/46.

Therefore, the airbag device M for a passenger seat of the illustrated embodiment is able to protect the head MH of the passenger MP adequately as it moves diagonally forward.

In the airbag device M of the illustrated embodiment, each of the arresting recesses 41 and 46 is formed out of a flat surfaced portion of the passenger protection region 35 (the recess-forming region 83/84 of the center panel 75, in the illustrated embodiment), by being pulled by the left tether 55L or right tether 55R. With this configuration, the bag body 16 does not have to be provided with an arresting recess in the production process, which will simplify the structure of the bag body 16 and help reduce the workload and cost in production of the bag body 16. The bag body 16 of the airbag device M is composed of only three base members; the center panel 75, left panel 87 and right panel 92. In comparison with such an airbag that would require separate base members for forming the arresting recess, the configuration of the illustrated embodiment will save such production processes as a cutting work and a sewing work of the base members.

Figure 13:
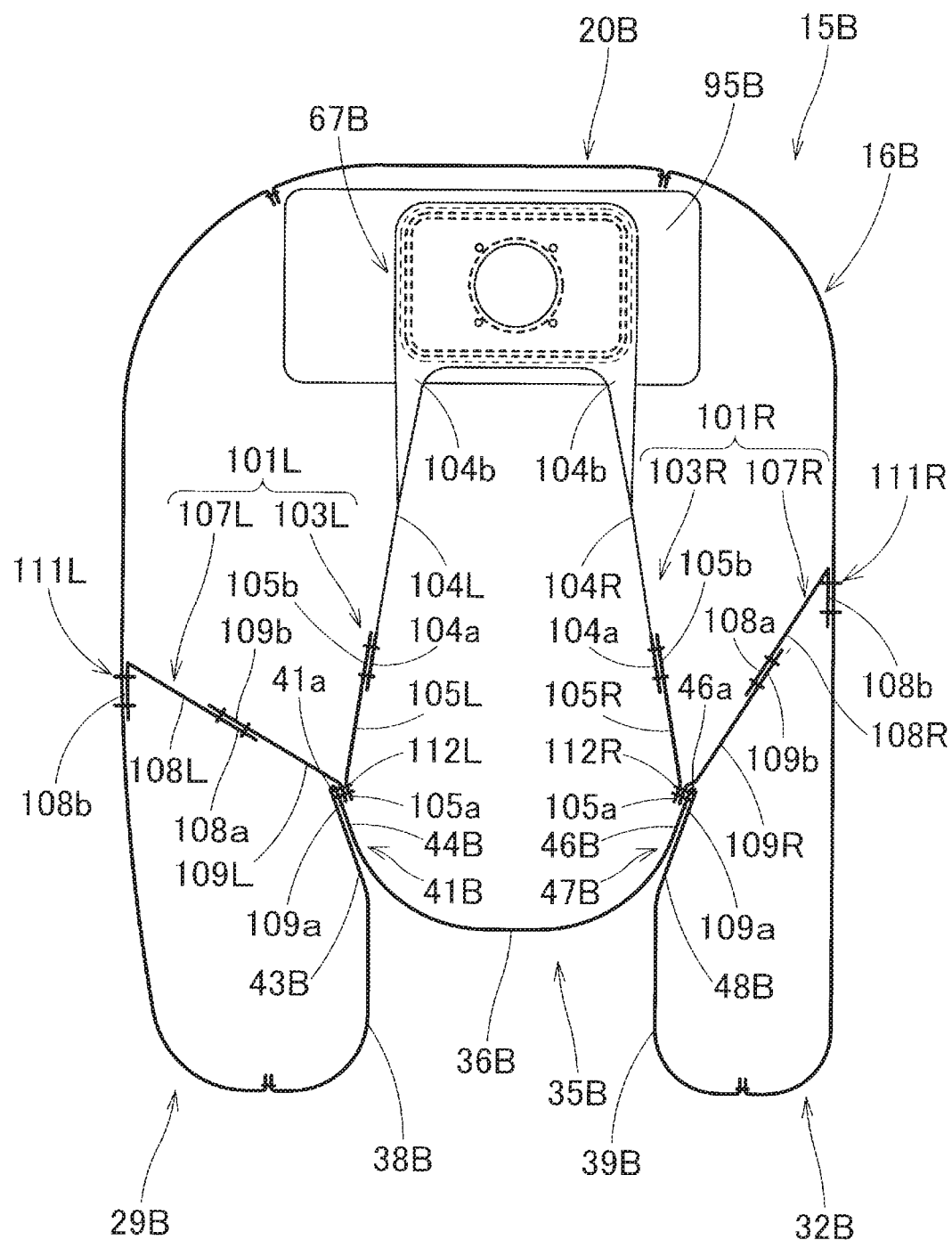
FIG. 13 is a schematic horizontal sectional view of an airbag according to a further alternative embodiment as inflated by itself.

In the airbag device M of the illustrated embodiment, in each of the left tether 55L and right tether 55R, the front-rear connecting region (i.e. the left front-rear connecting region 57L/the right front-rear connecting region 57R) and the sideways connecting region (i.e. the left sideways connecting region 60L/the right sideways connecting region 60R) share the common region 64 that extends from the leading end region of the arresting recess 41/46, and bifurcate from the front end 64b region of the common region 64. This configuration will further contribute to reduction of the workload and cost in the production process, and also reduce a volume of the airbag 15 as folded up. If such an advantageous effect does not have to be considered, each of the left tether and right tether may be configured like a left tether 101L and a right tether 101R of an airbag 15B which is depicted in FIG. 13 and described below in more detail. Each of the left tether 101L and right tether 101R includes a front-rear connecting region (a left front-rear connecting region 103L/a right front-rear connecting region 103R) and a sideways connecting region (a left sideways connecting region 107L/a right sideways connecting region 107R).

Each of the left front-rear connecting region 103L and the left sideways connecting region 107L of the left tether 101L separately extend from a leading end region of an arresting recess 41B, and each of the right front-rear connecting region 103R and the right sideways connecting region 107R of the right tether 101R separately extend from a leading end region of an arresting recess 46B.

In the airbag device M of the illustrated embodiment, the bag body 16 includes the main inflatable section 17 whose rear surface serves as the front-collision arresting plane 36, and the left protruding inflatable section 29 and right protruding inflatable section 32 each of which protrudes rearward from the rear surface (or rear side wall 26) of the main inflatable section 17 as deployed. The right side wall 29b of the left protruding inflatable region 29 and the left side wall 32a of the right protruding inflatable region 32 each of which extends generally along the front and rear direction and faces towards the front-collision arresting plane 36 at airbag deployment respectively serve as the left oblique-collision arresting plane 38 and right oblique-collision arresting plane 39. With this configuration, when catching a head MH of a passenger MP who moves diagonally forward, the airbag 15 is able to catch the head MH with the left or right oblique-collision arresting plane 38/39 first and guide it along the oblique-collision arresting plane 38/39 into the left or right arresting recess 41/46. As a consequence, the airbag 15 is able to arrest the head MH in the arresting recess 41 or 46 further adequately in the event of an oblique collision or an offset collision of the vehicle V. If such advantageous effects do not have to be considered, the airbag may be formed, without the protruding inflatable section, such that the oblique-collision arresting plane would be disposed at a side of the front-collision arresting plane in such a manner as to be generally flush with the front-collision arresting plane, and an arresting recess would be disposed between such an oblique-collision arresting plane and the front-collision arresting plane.

In the airbag device M of the illustrated embodiment, the oblique-collision arresting plane and the arresting recess are disposed both on the inboard side and outboard side (i.e. on the left side and right side) of the front-collision arresting plane 36 as deployed. With this configuration, the airbag 15 is able to protect a head MH of a passenger MP even if he moves forward towards an outboard direction (forward to the right, in the illustrated embodiment) or he moves forward towards an inboard direction (forward to the left, in the illustrated embodiment). If such an advantageous effect does not have to be considered, the airbag may be provided with the oblique-collision arresting plane and the arresting recess only either one side of the front-collision arresting plane.

In the airbag device M of the illustrated embodiment, the outboard-side sideways connecting region (i.e. right sideways connecting region) 60R of the tether 55 (right tether 55R) which is deployed on an outboard side at airbag deployment has a smaller substantial length than the inboard-side sideways connecting region (i.e. left sideways connecting region) 60L of the left tether 55L which is deployed on an inboard side. This configuration is able to make the width in the left and right direction of the outboard-side protruding inflatable region (i.e. right protruding inflatable region) 32 smaller than that of the inboard-side protruding inflatable region (i.e. left protruding inflatable region) 29, in other words, able to inflate the outboard-side protruding inflatable region 32 thinner than the inboard-side protruding inflatable region 29, at airbag deployment. The right protruding inflatable region 32 as inflated thinly will be deployed smoothly even if the head-protecting airbag 98 is deployed over the window W at a side of the passenger seat PS, and will not interfere with the deployment of the head-protecting airbag 98. In the meantime, with no obstacles, the inboard-side (i.e. left) protruding inflatable region 29 as inflated thicker than the outboard-side (i.e. right) protruding inflatable region 32 will be able to catch adequately a head MH of a passenger MP which moves diagonally forward towards the driver's seat DS with the left oblique-collision arresting plane 38 (i.e. the right side wall 29b of the left protruding inflatable region 29). If such an advantageous effect does not have to be considered, the length of the outboard-side sideways connecting region may be generally equal to that of the inboard-side sideways connecting region, or the length of the inboard-side sideways connecting region may be greater than that of the outboard-side sideways connecting region.

Furthermore, the airbag device M of the illustrated embodiment includes the transverse tether 72 that is disposed generally along the left and right direction inside the bag body 16, and connects the left side wall 18c of the bag body 16 to the right side wall 18d opposed to the left side wall 18c for limiting a width in the left and right direction of the bag body 16 as inflated. By limiting a clearance between the left side wall 18c and right side wall 18d of the bag body 16 as inflated, the transverse tether 72 prevents the bag body 16 from oscillating in the front and rear direction and in the left and right direction at airbag deployment, thus helps inflate the bag body 16 quickly. The airbag 15 of the illustrated embodiment is provided with only one transverse tether 72 above the left tether 55L and right tether 55R (more specifically, above the left front-rear connecting region 57L and right front-rear connecting region 57R). However, the location and number of the transverse tether should not be limited thereby. The transverse tether may be disposed below the left and right tethers 55L and 55R, or both above and below the left and right tethers 55L and 55R. The positions of joints of the transverse tether to the left side wall and right side wall should not be limited to those described in the illustrated embodiment, either. The transverse tether may be joined to the left side wall and right side wall at different positions from the joints of the left and right sideways connecting regions.

Figure 12:
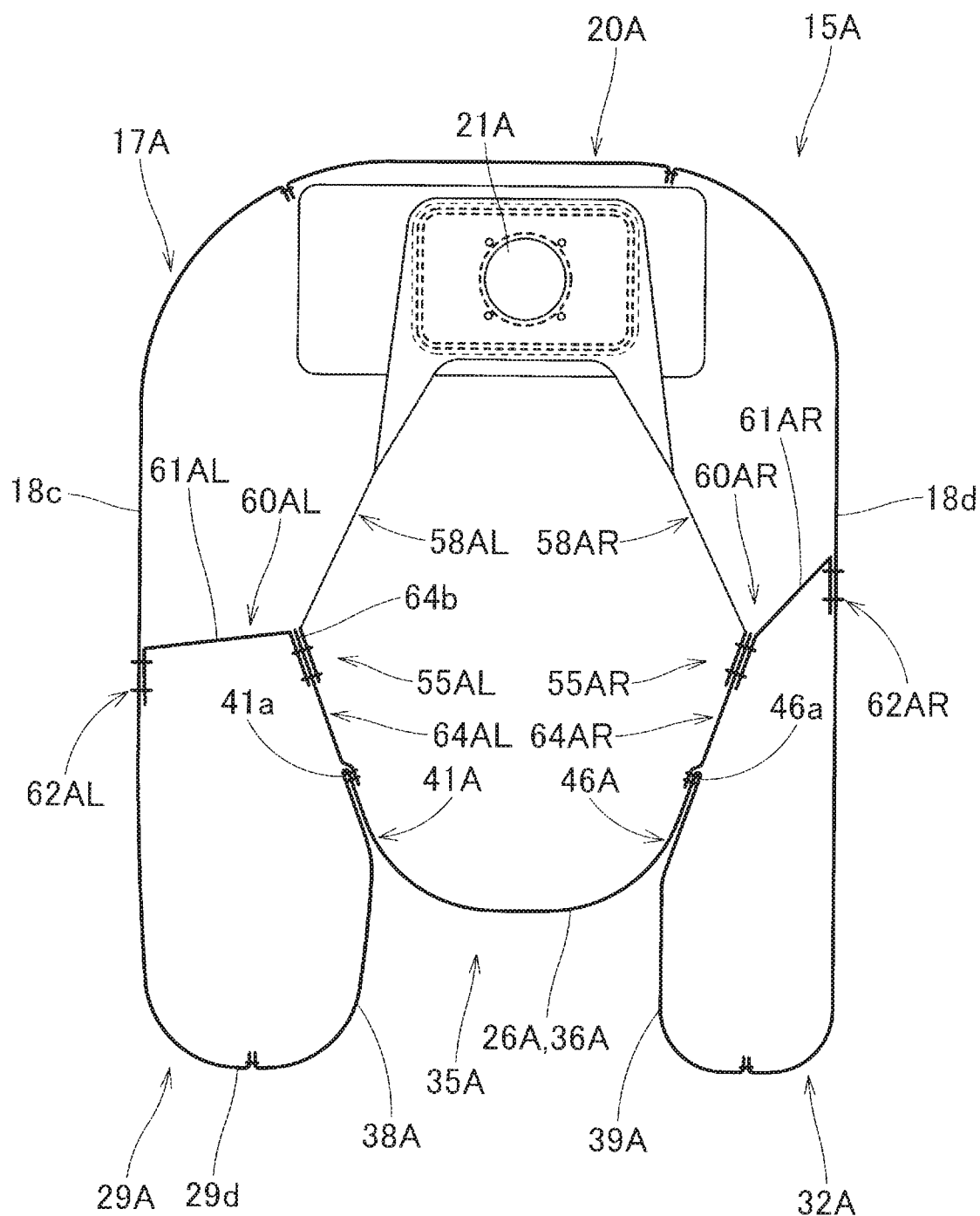
FIG. 12 is a schematic horizontal sectional view of an airbag according to an alternative embodiment as inflated by itself.

If such an advantageous effect does not have to be considered, the airbag may be configured with no transverse tether, as an airbag 15A depicted in FIG. 12. The airbag 15A includes no transverse tether, and has similar configurations to the airbag 15 of the foregoing embodiment except in that a joint 62AL of a left sideways connecting region 60AL to the left side wall 18c is located farther rearward than a joint 62AR of a right sideways connecting region 60AR to the right side wall 18d. Therefore, detailed descriptions of common members will be omitted, and the common members will be given a symbol "A" at the end of common reference numerals. In the airbag 15A, the joint 62AR of the right sideways connecting region 60AR to the right side wall 18d is located farther forward than the leading end or front end 41a of the left arresting recess 41A, but slightly at the rear of the front end 64b of the common region 64AL, at airbag deployment. That is, in the airbag 15A, the joint 62AL of the leading end 61b of the left sideways connecting region 60AL to the left side wall 18c is located farther rearward in comparison with the airbag 15 of the foregoing embodiment. With this configuration, a left protruding inflatable region 29A will be deployed slightly diagonally such that a rear end 29d is directed towards the center in the left and right direction (in other words, towards a front-collision arresting plane 36) in comparison with the left protruding inflatable region 29 of the airbag 15 of the foregoing embodiment, as referred to FIGS. 6 and 12.

Further alternatively, the airbag may be configured like the airbag 15B depicted in FIG. 13. The airbag 15B has similar configurations to the airbag 15 of the foregoing embodiment except in a left tether 101L and a right tether 101R for forming a left arresting recess 41B and a right arresting recess 46B. Therefore, detailed descriptions of common members will be omitted, and the common members will be given a symbol "B" at the end of common reference numerals.

In each of the left tether 101L and right tether 101R, a front-rear connecting region (i.e. a left front-rear connecting region 103L/a right front-rear connecting region 103R) and a sideways connecting region (i.e. a left sideways connecting region 107L/a right sideways connecting region 107R) separately extend from a leading end 41a/46a region of an arresting recess 41B/46B.

Figure 14:
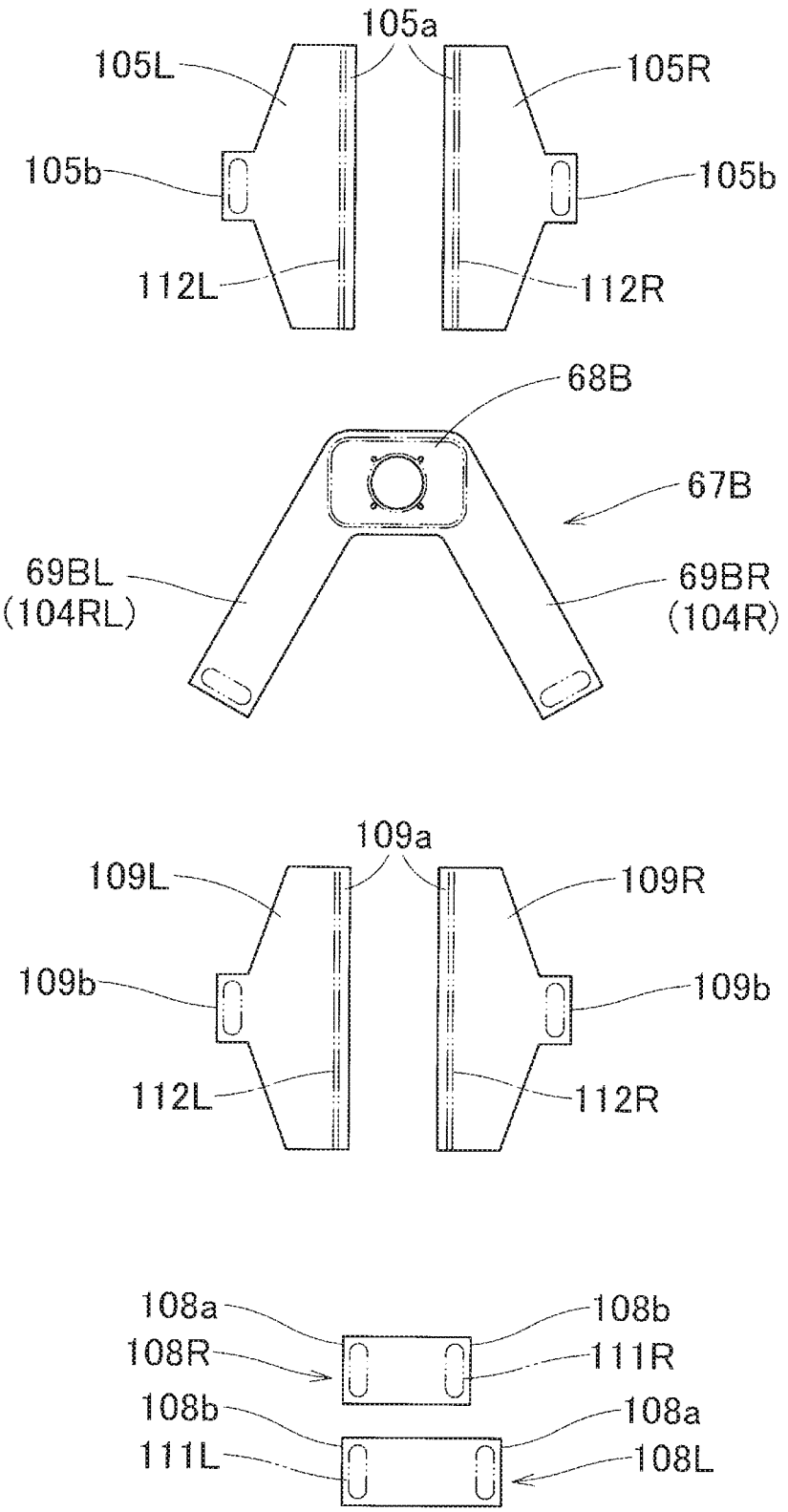
FIG. 14 depict base members of tethers of the airbag of FIG. 13 by plan views.

The left front-rear connecting region 103L and right front-rear connecting region 103R respectively connect the leading ends or front ends 41a and 46a of the left arresting recess 41B and right arresting recess 46B to a front end portion (i.e. to a vicinity of the mounting region 20B) of the bag body 16B. More specifically, a front end 104b of each of the left front-rear connecting region 103L and right front-rear connecting region 103R is joined to a periphery of the gas inlet port 21B of the bag body 16B, in other words, to a portion of the front end portion of the bag body 16B in front of a center in a left and right direction of the front-collision arresting plane 36B. In the illustrated embodiment, each of the left front-rear connecting region 103L and right front-rear connecting region 103R is composed of a front section 104L/104R and a rear section 105L/105R, as can be seen in FIG. 14. The rear sections 105L and 105R are generally identical in outer contour to the common regions 64L and 64R of the airbag 15, respectively. The front sections 104L and 104R are composed of a tether base cloth 67B (FIG. 14) which is generally identical in outer contour to the tether base cloth 67 of the airbag 15. The tether base cloth 67B includes a joint section 68B which is shared by both of the front-rear connecting regions 103L and 103R and joined to the periphery of the gas inlet port 21B, and two band sections 69BL and 69BR each of which extends diagonally with respect to a front and rear direction from the joint section 68B, thus the base cloth 67B has a generally bilaterally symmetric contour as developed flatly. The band sections 69BL and 69BR constitute the front sections 104L and 104R, respectively.

The left sideways connecting region 107L connects the leading end or front end 41a of the left arresting recess 41B to a side wall of the bag body 16B near the left oblique-collision arresting plane 38B (specifically, to the left side wall 18c of the circumferential wall 18B of the main inflatable section 17B). The right sideways connecting region 107R connects the leading end or front end 46a of the right arresting recess 46B to a side wall of the bag body 16B near the right oblique-collision arresting plane 39B (specifically, to the right side wall 18d of the circumferential wall 18B of the main inflatable section 17B). In the illustrated embodiment, each of the left sideways connecting region 107L and right sideways connecting region 107R is composed of a front section 108L/108R and a rear section 109L/109R, as can be seen in FIG. 14. The rear sections 109L and 109R are generally identical in outer contour to the common regions 64L and 64R of the airbag 15, respectively. That is, the rear sections 109L and 109R are also generally identical in outer contour to the rear sections 105L and 105R of the left and right front-rear connecting regions 103L and 103R, respectively. Each of the front sections 108L and 108R has a band-shaped outer contour. In the illustrated embodiment, the front section 108R forming the right sideways connecting region 107R has a shorter length than the front section 108L forming the left sideways connecting region 107L. Moreover, as can be seen in FIG. 13, a joint 111L that joins a leading end 108b of the front section 108L to the left side wall 18c is located farther forward than a leading end or front end 41a of the left arresting recess 41B at airbag deployment, and a joint 111R that joins a leading end 108b of the front section 108R to the right side wall 18d is located farther forward than a leading end or front end 46a of the right arresting recess 46B at airbag deployment. In the illustrated embodiment, more specifically, the joint 111L that joins the left sideways connecting region 107L to the left side wall 18c is located farther rearward than the joint 111R that joins the right sideways connecting region 107R to the right side wall 18d at airbag deployment.

In the airbag 15B configured as described above, due to cooperation of the front-rear connecting region (i.e. the left front-rear connecting region 103L/the right front-rear connecting region 103R) and the sideways connecting region (i.e. the left sideways connecting region 107L/the right sideways connecting region 107R), the left tether 101L and right tether 101R respectively help deploy the arresting recesses 41 and 46 diagonally with respect to the front and rear direction such that the leading end or front end 41a/46a is directed outwardly in a left and right direction, and the opposing walls (i.e. opposing walls 43B and 44B/48B and 49B) of the arresting recess 41/46 push each other. In each of the left tether 101L and right tether 101R of the airbag 15B, the rear section 105L/105R of the front-rear connecting region 103L/103R and the rear section 109L/109R of the sideways connecting region 107L/107R are joined together to the center panel 75B to form a joint 112L/112R. The joints 112L and 112R respectively form the leading ends or front ends 41a and 46a of the left arresting recess 41B and right arresting recess 46B at airbag deployment.

Figure 15:
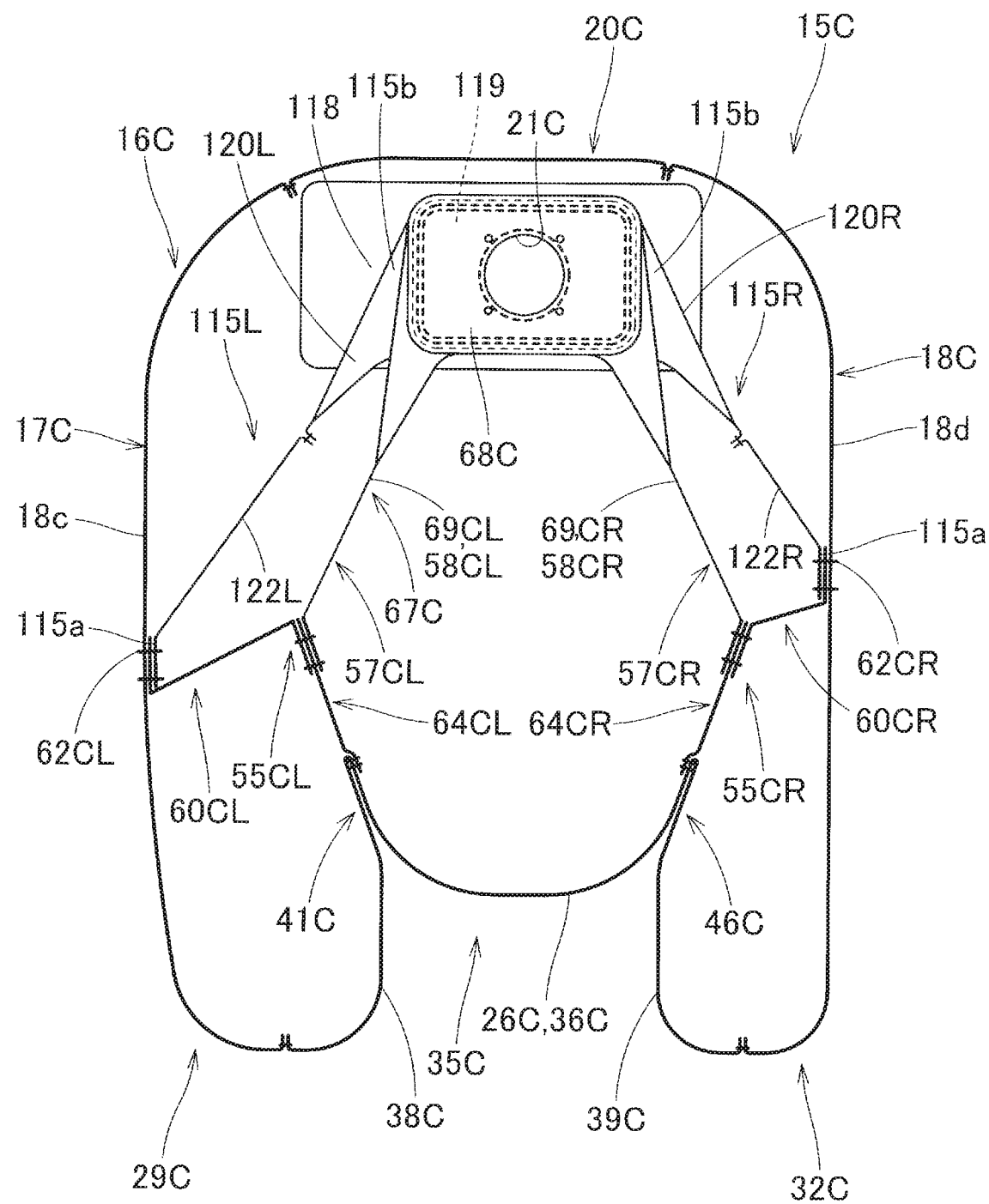
FIG. 15 is a schematic horizontal sectional view of an airbag according to a further alternative embodiment as inflated by itself.

Further alternatively, an airbag 15C depicted in FIG. 15 may be adopted. The airbag 15C has similar configurations to the airbag 15 of the foregoing embodiment except in further including a left oscillation-preventing tether 115L and a right oscillation-preventing tether 115R inside the bag body 16C. Therefore, detailed descriptions of common members will be omitted, and the common members will be given a symbol "C" at the end of common reference numerals.

Figure 16:
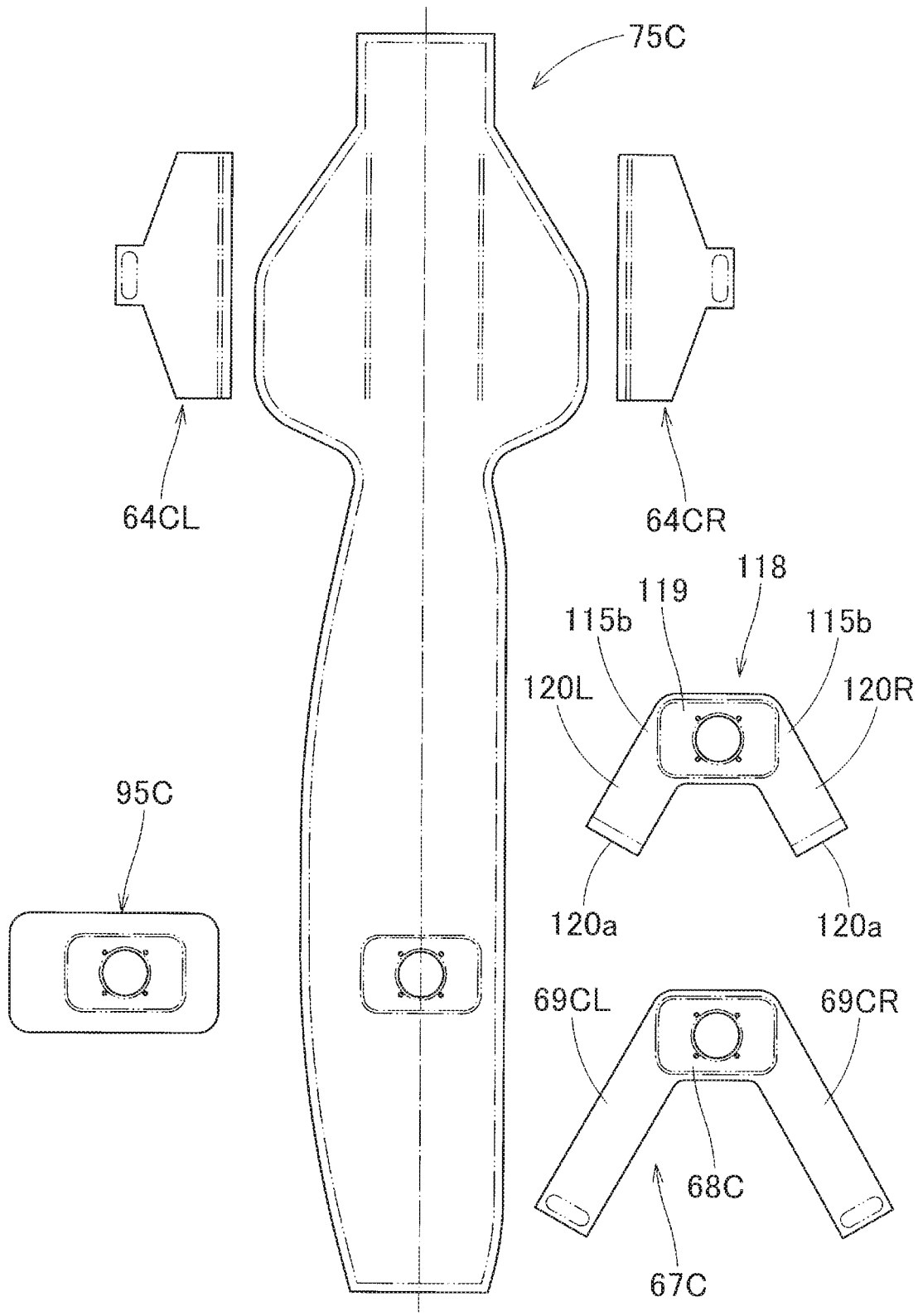
FIGS. 16 and 17 depict base members of the airbag of FIG. 15 by plan views.
Figure 17:
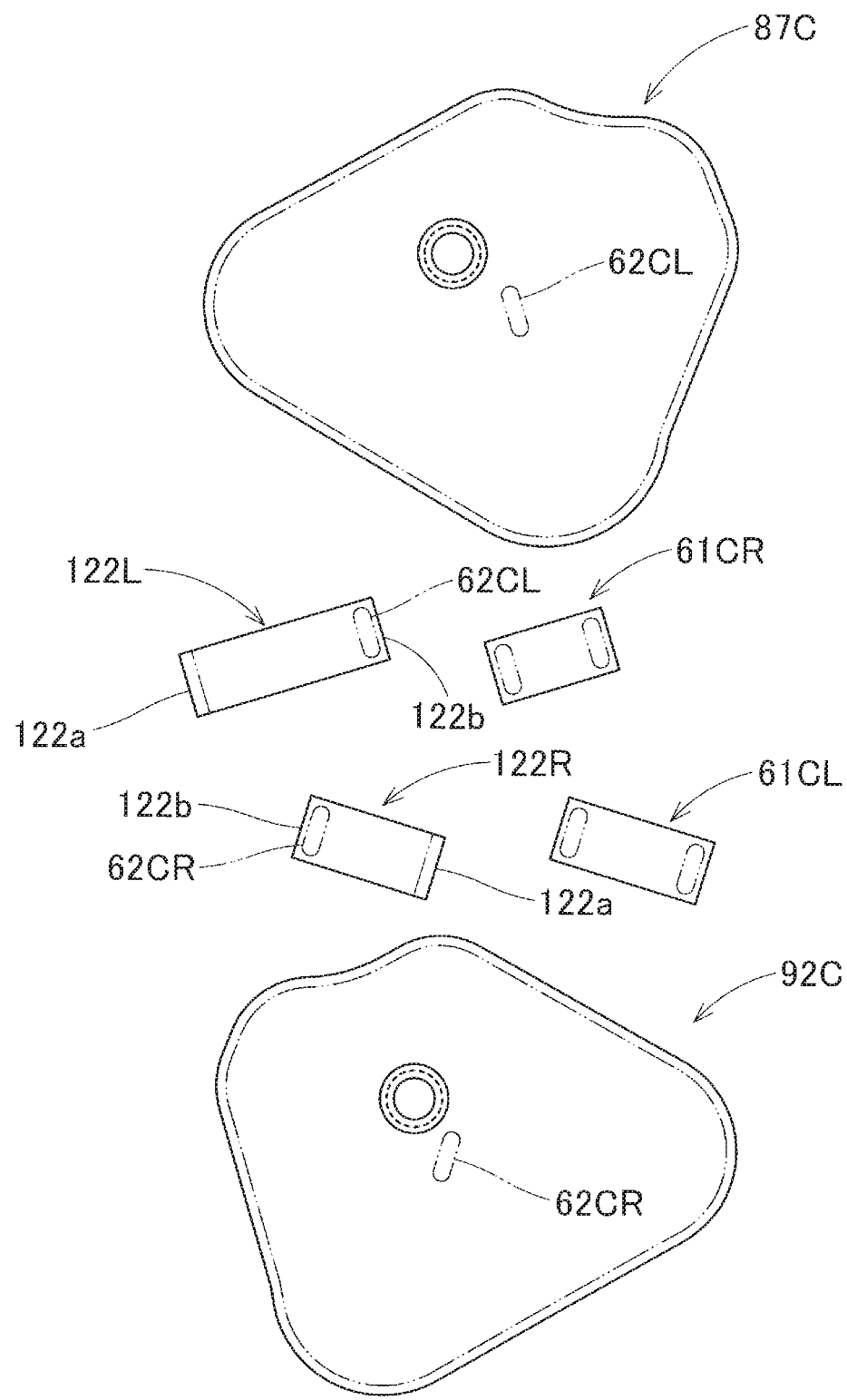

As can be seen in FIG. 15, the left oscillation-preventing tether 115L and right oscillation-preventing tether 115R respectively connect the periphery of the gas inlet port 21C (in other words, a portion in the front end portion of the bag body 16C in front of a center in a left and right direction of the front-collision arresting plane 36C) to the left side wall 18c and right side wall 18d of the main inflatable section 17C. Further, the left oscillation-preventing tether 115L and right oscillation-preventing tether 115R are respectively designed to be deployed in front of the left tether 55CL and right tether 55CR. In the illustrated embodiment, each of the left oscillation-preventing tether 115L and right oscillation-preventing tether 115R is disposed farther to the left/right than the left front-rear connecting region 57CL/right front-rear connecting region 57CR and farther forward than the left sideways connecting region 60CL/right sideways connecting region 60CR. In the illustrated embodiment, as can be seen in FIGS. 16 and 17, each of the left oscillation-preventing tether 115L and right oscillation-preventing tether 115R is composed of a tether base cloth 118 and a band-shaped cloth 122L/122R. The tether base cloth 118 includes a joint section 119 which is shared by both of the oscillation preventing tethers 115L and 115R and joined to the periphery of the gas inlet port 21C, and two band sections 120L and 120R each of which extends diagonally with respect to a front and rear direction from the joint section 119. Each of the band-shaped cloths 122L and 122R is joined to the band section 120L/120R by the end 122a, and the band section 120L and the band-shaped cloth 122L, and the band section 120R and the band-shaped cloth 122R respectively form the oscillation-preventing tethers 115L and 115R. The joint section 119 of the base cloth 118 is joined to the periphery of the gas inlet port 21C together with the joint section 68C of the tether base cloth 67C, and is provided with a number of openings (reference numerals omitted) which correspond to the gas inlet port 21 and mounting holes 22 of the airbag 15C. In a flattened state, the band sections 120L and 120R extend diagonally with respect to a front and rear direction in such a manner as to draw away from each other towards the rear ends, by which rear ends the band sections 120L and 120R are connected to the ends 122a of the band-shaped cloths 122L and 122R. Thus the left oscillation-preventing tether 115L and right oscillation-preventing tether 115R are deployable diagonally with respect to the front and rear direction such that rear ends 115a, which are composed of the ends 122b of the band-shaped cloth 122L and 122R, draw away from each other in a left and right direction at airbag deployment. In the illustrated embodiment, as can be seen in FIGS. 15 and 17, the rear ends 115a of the left oscillation-preventing tether 115L and right oscillation-preventing tether 115R (i.e. the ends 122b of the band-shaped cloths 122L and 122R) are respectively joined to the left side wall 18c and right side wall 18d by the joints 62CL and 62CR which also respectively join the leading ends 61b of the left sideways connecting region 60CL and right sideways connecting region 60CR to the left side wall 18c and right side wall 18d. In the airbag 15C, the joint 62CL which joins the leading end 61b of the left sideways connecting region 60CL to the left side wall 18c is disposed farther rearward than the joint 62CR which joins the leading end 61b of the right sideways connecting region 60CR to the right side wall 18d at airbag deployment. Accordingly, the band-shaped cloth 122L forming the left oscillation-preventing tether 115L is made greater in length than the band-shaped cloth 122R forming the right oscillation-preventing tether 115R. Lengths of the left oscillation-preventing tether 115L and right oscillation-preventing tether 115R are determined so as to limit a clearance between the left side wall 18c and right side wall 18d of the main inflatable section 17C at airbag deployment for controlling a deployed contour of the main inflatable section 17C. The left oscillation-preventing tether 115L and right oscillation-preventing tether 115R prevent the left side wall 18c and right side wall 18d of the main inflatable section 17C (i.e. walls of the main inflatable section 17C opposed in the left and right direction) from being separated from each other too much, thus prevent the bag body 16C from oscillating in the front and rear direction and in the left and right direction during deployment. Therefore, the bag body 16 is able to be inflated quickly.

Figure 18:
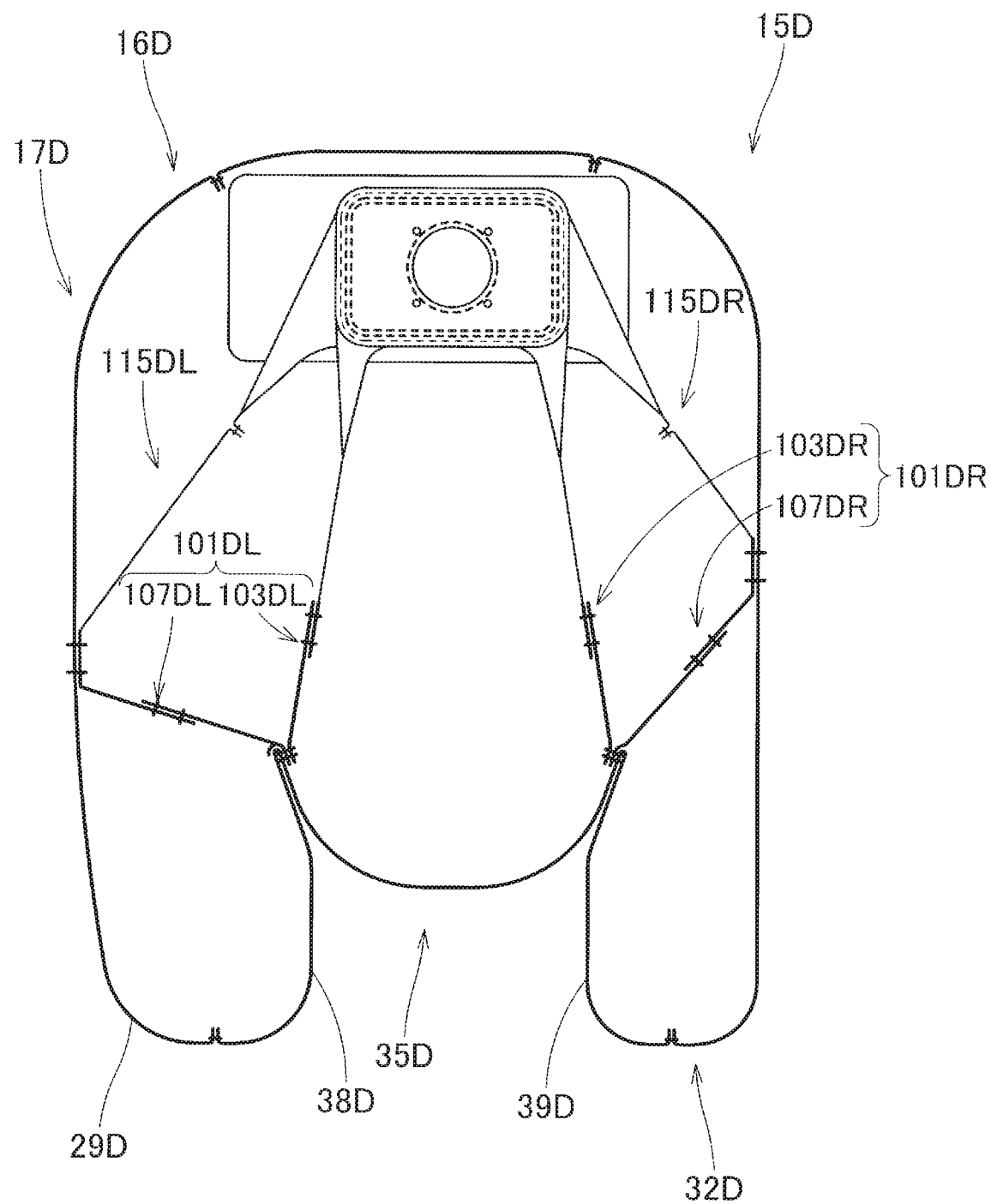
FIG. 18 is a schematic horizontal sectional view of an airbag according to a further alternative embodiment as inflated by itself.

Further alternatively, the airbag may be configured like an airbag 15D depicted in FIG. 18. The airbag 15D includes, inside a bag body 16D, a left oscillation-preventing tether 115DL and a right oscillation-preventing tether 115DR in combination with a left tether 101DL and a right tether 101DR.

Yet further alternatively, the airbag may be configured such that a protruding amount from the front-collision arresting plane 36 of the right (i.e. outboard-side) protruding inflatable section 32 is smaller than that of the left (i.e. inboard-side) protruding inflatable section 29, as indicated with double-dotted lines in FIG. 9. This configuration will further prevent the outboard-side protruding inflatable region from being engaged with the head-protecting airbag 98 or the like at airbag deployment.

The left arresting recess 41 and right arresting recess 46 of the airbag 15 are depicted in the accompanying drawings as if a gap is formed between the left side wall 43/48 and right side wall 44/49. In a real airbag, however, there arises no gap between a left side wall and a right side wall of an arresting recess because the left side wall and right side wall are pressed against each other at airbag deployment.

What is claimed is:

1. An airbag device for a passenger seat adapted to be mounted on an instrument panel in front of a passenger seat of a vehicle, the airbag device comprising a housing that is adapted to be mounted on the instrument panel, and an inflatable airbag that is housed in the housing in a folded-up configuration, the airbag comprising:
   a bag body that is mounted on the housing by a front end portion thereof so as to be deployed rearward, the bag body including a first side wall and a second side wall that are opposed to each other in a left and right direction at airbag deployment;
   a passenger protection region that is composed of a rear portion of the bag body as deployed, the passenger protection region comprising:
   a front-collision arresting plane for protecting a head of a passenger as he moves forward in the event of a frontal collision of the vehicle;
   an oblique-collision arresting plane that is disposed on a left side and/or a right side of the front-collision arresting plane for protecting the head of the passenger as he moves diagonally forward in the event of an oblique collision or an offset collision of the vehicle; and
   an arresting recess that is recessed forward between the front-collision arresting plane and the oblique-collision arresting plane for receiving and arresting the head of the passenger therein; and
   a tether that is disposed inside the bag body for controlling a contour of the bag body as deployed, wherein the tether pulls a flat surfaced portion of the passenger protection region and forms the arresting recess out of the flat surfaced portion at airbag deployment, the tether including:
     a front-rear connecting region that connects a leading end region of the arresting recess to a portion of the front end portion of the bag body in front of a center in a left and right direction of the front-collision arresting plane; and
     a sideways connecting region that connects the leading end region of the arresting recess to one of the side walls of the bag body which is disposed near the oblique-collision arresting plane, wherein a joint of the sideways connecting region to the side wall is disposed farther forward than the leading end of the arresting recess,
   wherein
   the front-rear connecting region and the sideways connecting region of the tether share a common region that extends from the leading end region of the arresting recess, and bifurcate from a front end of the common region.

2. The airbag device of claim 1, wherein:
the bag body includes a main inflatable section that includes a rear surface serving as the front-collision arresting plane, and a protruding inflatable section that protrudes rearward from the rear surface of the main inflatable section as deployed; and
the oblique-collision arresting plane is composed of a side wall of the protruding inflatable section which extends generally along a front and rear direction and faces towards the front-collision arresting plane at airbag deployment.

3. The airbag device of claim 2, further comprising a first and a second oscillation-preventing tether each of which is deployable in front of the tether inside the bag body,
wherein the first oscillation-preventing tether connects the portion of the front end portion of the bag body in front of the center in the left and right direction of the front-collision arresting plane and a side wall of the main inflatable section;
wherein the second oscillation-preventing tether connects the portion of the front end portion of the bag body in front of the center in the left and right direction of the front-collision arresting plane and the other side wall of the main inflatable section opposed to said side wall in the left and right direction; and
wherein each of the oscillation-preventing tethers is deployable diagonally with respect to the front and rear direction.

4. An airbag device for a passenger seat adapted to be mounted on an instrument panel in front of a passenger seat of a vehicle, the airbag device comprising a housing that is adapted to be mounted on the instrument panel, and an inflatable airbag that is housed in the housing in a folded-up configuration, the airbag comprising:
a bag body that is mounted on the housing by a front end portion thereof so as to be deployed rearward, the bag body including a first side wall and a second side wall that are opposed to each other in a left and right direction at airbag deployment;
a passenger protection region that is composed of a rear portion of the bag body as deployed, the passenger protection region comprising:
a front-collision arresting plane for protecting a head of a passenger as he moves forward in the event of a frontal collision of the vehicle;
an oblique-collision arresting plane that is disposed on a left side and/or a right side of the front-collision arresting plane for protecting the head of the passenger as he moves diagonally forward in the event of an oblique collision or an offset collision of the vehicle; and
an arresting recess that is recessed forward between the front-collision arresting plane and the oblique-collision arresting plane for receiving and arresting the head of the passenger therein; and
a tether that is disposed inside the bag body for controlling a contour of the bag body as deployed, wherein the tether pulls a flat surfaced portion of the passenger protection region and forms the arresting recess out of the flat surfaced portion at airbag deployment, the tether including:
a front-rear connecting region that connects a leading end region of the arresting recess to a portion of the front end portion of the bag body in front of a center in a left and right direction of the front-collision arresting plane; and
a sideways connecting region that connects the leading end region of the arresting recess to one of the side walls of the bag body which is disposed near the oblique-collision arresting plane, wherein a joint of the sideways connecting region to the side wall is disposed farther forward than the leading end of the arresting recess,
wherein
the bag body includes a main inflatable section that includes a rear surface serving as the front-collision arresting plane, and a protruding inflatable section that protrudes rearward from the rear surface of the main inflatable section as deployed,
the oblique-collision arresting plane is composed of a side wall of the protruding inflatable section which extends generally along a front and rear direction and faces towards the front-collision arresting plane at airbag deployment, and
the oblique-collision arresting plane, the arresting recess and the tether are disposed both on a left side and a right side of the front-collision arresting plane as deployed.

5. The airbag device of claim 4, wherein:
the sideways connecting region of the tether which is disposed on an outboard side of the front-collision arresting plane as the airbag is mounted on board serves as an outboard-side sideways connecting region;
the sideways connecting region of the tether which is disposed on an inboard side of the front-collision arresting plane as the airbag is mounted on board serves as an inboard-side sideways connecting region; and
a length of the outboard-side sideways connecting region is smaller than that of the inboard-side sideways connecting region.

6. The airbag device of claim 4, wherein:
the protruding inflatable section which is disposed on an outboard side of the front-collision arresting plane as the airbag is mounted on board serves as an outboard-side protruding inflatable section;
the protruding inflatable section which is disposed on an inboard side of the front-collision arresting plane as the airbag is mounted on board serves as an inboard-side protruding inflatable section; and
a protruding amount from the front-collision arresting plane of the outboard-side protruding inflatable section is smaller than that of the inboard-side protruding inflatable section.

7. An airbag device for a passenger seat adapted to be mounted on an instrument panel in front of a passenger seat of a vehicle, the airbag device comprising a housing that is adapted to be mounted on the instrument panel, and an inflatable airbag that is housed in the housing in a folded-up configuration, the airbag comprising:
a bag body that is mounted on the housing by a front end portion thereof so as to be deployed rearward, the bag body including a first side wall and a second side wall that are opposed to each other in a left and right direction at airbag deployment;
a passenger protection region that is composed of a rear portion of the bag body as deployed, the passenger protection region comprising:
a front-collision arresting plane for protecting a head of a passenger as he moves forward in the event of a frontal collision of the vehicle;

an oblique-collision arresting plane that is disposed on a left side and/or a right side of the front-collision arresting plane for protecting the head of the passenger as he moves diagonally forward in the event of an oblique collision or an offset collision of the vehicle; and an arresting recess that is recessed forward between the front-collision arresting plane and the oblique-collision arresting plane for receiving and arresting the head of the passenger therein; and a tether that is disposed inside the bag body for controlling a contour of the bag body as deployed, wherein the tether pulls a flat surfaced portion of the passenger protection region and forms the arresting recess out of the flat surfaced portion at airbag deployment, the tether including:

a front-rear connecting region that connects a leading end region of the arresting recess to a portion of the front end portion of the bag body in front of a center in a left and right direction of the front-collision arresting plane;

a sideways connecting region that connects the leading end region of the arresting recess to one of the side walls of the bag body which is disposed near the oblique-collision arresting plane, wherein a joint of the sideways connecting region to the side wall is disposed farther forward than the leading end of the arresting recess; and a transverse tether that is disposed generally along the left and right direction inside the bag body, and connects the first side wall of the bag body to the second side wall for limiting a width in the left and right direction of the bag body as inflated.

8. The airbag device of claim 7, wherein the front-rear connecting region and the sideways connecting region of the tether separately extend from the leading end region of the arresting recess.

* * * * *